US012587414B2

(12) United States Patent (10) Patent No.: US 12,587,414 B2
Wang et al. (45) Date of Patent: Mar. 24, 2026

(54) METHODS AND APPARATUS SUPPORTING DYNAMIC ETHERNET VLAN CONFIGURATION IN A FIFTH GENERATION SYSTEM

(71) Applicant: Telefonaktiebolaget LM Ericsson (publ), Stockholm (SE)

(72) Inventors: Kun Wang, Solna (SE); Ala Nazari, Handen (SE); György Miklós, Pilisborosjenö (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 290 days.

(21) Appl. No.: 18/568,829

(22) PCT Filed: Jul. 1, 2022

(86) PCT No.: PCT/EP2022/068260
§ 371 (c)(1),
(2) Date: Dec. 10, 2023

(87) PCT Pub. No.: WO2023/280705
PCT Pub. Date: Jan. 12, 2023

(65) Prior Publication Data
US 2024/0275636 A1 Aug. 15, 2024

Related U.S. Application Data

(60) Provisional application No. 63/218,291, filed on Jul. 3, 2021.

(51) Int. Cl.
*H04L 12/46* (2006.01)
(52) U.S. Cl.
CPC ................................ *H04L 12/4641* (2013.01)

(58) Field of Classification Search
CPC . H04L 12/4641; H04L 12/4645; H04L 12/46; H04L 12/4675; H04L 12/4679;
(Continued)

(56) References Cited

U.S. PATENT DOCUMENTS 9,838,337 B1 * 12/2017 Pinnamraju ............. H04L 49/25
2019/0238365 A1 * 8/2019 Sudhakaran ........ H04L 61/2592
(Continued)

FOREIGN PATENT DOCUMENTS

CN          113497734 A  * 10/2021  ......... H04L 41/0803
WO        2020041368 A1    2/2020
WO    WO-2020072652 A1 *  4/2020  ............ H04W 76/16

OTHER PUBLICATIONS

"3rd Generation Partnership Project; Technical Specification Group Services and System Aspects; System architecture for the 5G System (5GS); Stage 2 (Release 17)", 3GPP TS 23.501 V17.1.0, Jun. 2021, 526 pages.
(Continued)

*Primary Examiner* — Ricky Q Ngo
(74) *Attorney, Agent, or Firm* — Murphy, Bilak & Homiller, PLLC

(57) ABSTRACT

Methods and apparatuses for a 5G System (5GS) (20) support dynamic and semi-dynamic VLAN configuration for Ethernet bridging services provided by the 5GS. The 5GS (20) includes a node that is configured to receive and store VLAN configuration information for a CE (12). Particularly, the VLAN configuration information, which comprises a single predefined VLAN ID (VID) or a list of non-predefined VIDs or a single non-predefined VID, may be stored advantageously within 5G Virtual Network (VN) Group Data and indicates whether the UE (12) acts as an Ethernet trunk port or access port. With respect to the 5GS (20) establishing or modifying an Ethernet PDU session for the UE (12), a UPF (22) of the 5GS (20) configures Ethernet
(Continued)

bridging operations for the UE as an access port or a trunk port, in dependence on the VLAN configuration information.

20 Claims, 7 Drawing Sheets

(58) Field of Classification Search
CPC .............. H04L 41/0856; H04L 49/354; H04L 63/0272; H04L 67/14; H04W 76/12; H04W 76/22
See application file for complete search history.

(56) References Cited

U.S. PATENT DOCUMENTS

2020/0365012 A1* 11/2020 Zagajac ........... G08G 1/096783
2021/0345113 A1* 11/2021 Parron ................ H04L 12/4675

OTHER PUBLICATIONS

SA WG2 Meeting #137E, S2-2002208r01, (revision of S2-19yyyyy), Nokia, Nokia Shanghai Bell, Elbonia, Feb. 24-27, 2020, 7 pages.
"3GPP TS 23.501 V17.2.0", 3rd Generation Partnership Project; Technical Specification Group Services and System Aspects; System architecture for the 5G System (5GS); Stage 2 (Release 17), Sep. 2021, 1-542.

"3rd Generation Partnership Project; Technical Specification Group Core Network and Terminals; 5G System; Unified Data Management Services; Stage 3 (Release 17)", 3GPP TS 29.503 V17.4.0, Sep. 2021, 440 pages.
"3rd Generation Partnership Project; Technical Specification Group Services and System Aspects; System architecture for the 5G System (5GS); Stage 2 (Release 17)", 3GPP TS 23.501 V17.0.0, Mar. 2021, 489 pages.
"Introduction of 5G LAN-type service", 3GPP TSG-SA WG2 Meeting #130, S2-1900675, Huawei, HiSilicon, Kochi, India, Jan. 21-25, 2018, 10 pages.
"New SID on generic group management, exposure and communication enhancements", 3GPP TSG-WG SA2 Meeting #148E e-meeting, S2-2109355, Huawei, HiSilicon, Samsung et al., Elbonia, Nov. 15-22, 2021, 6 pages.
"New SID: Study on 5G Timing Resiliency and TSC enhancements", 3GPP SA WG2 Meeting #145E, S2-2104125, Nokia, Nokia Shanghai Bell, Verizon, AT&T, Elbonia,, May 17-28, 2021, 4 pages.
"VLAN Information configuration and information exchange", SA WG2 Meeting #S2-138e, S2-2003173, Nokia, Nokia Shanghai Bell, Elbonia, Apr. 20-23, 2020, 5 pages.
"VLAN Information configuration and information exchange", 3GPP SA WG2 Meeting S2#137E, S2-2002207, SA WG2 Temporary Document, Nokia, Nokia Shanghai Bell, Elbonia, Feb. 24-27, 2020, 4 pages.
3GPP , "3rd Generation Partnership Project; Technical Specification Group Services and System Aspects; Procedures for the 5G System (5GS); Stage 2 (Release 17)", 3GPP TS 23.502 V17.0.0, Mar. 2021, 1-646.

* cited by examiner

COMMUNICATION INTERFACE CIRCUITRY 50

TX 52

RX 54

PROCESSING CIRCUITRY 56

STORAGE 58

CP(s) 60

DATA 62

NW NODE 40

NF 34

PROCESSING MODULE/UNIT 70

40

RECEIVE VLAN CONFIGURATION INFORMATION FOR A UE FROM AN AF
402

STORE THE VLAN CONFIGURATION INFORMATION FOR SUBSEQUENT USE WHEN ESTABLISHING OR MODIFYING A ETHERNET PDU SESSION FOR THE UE
404

400

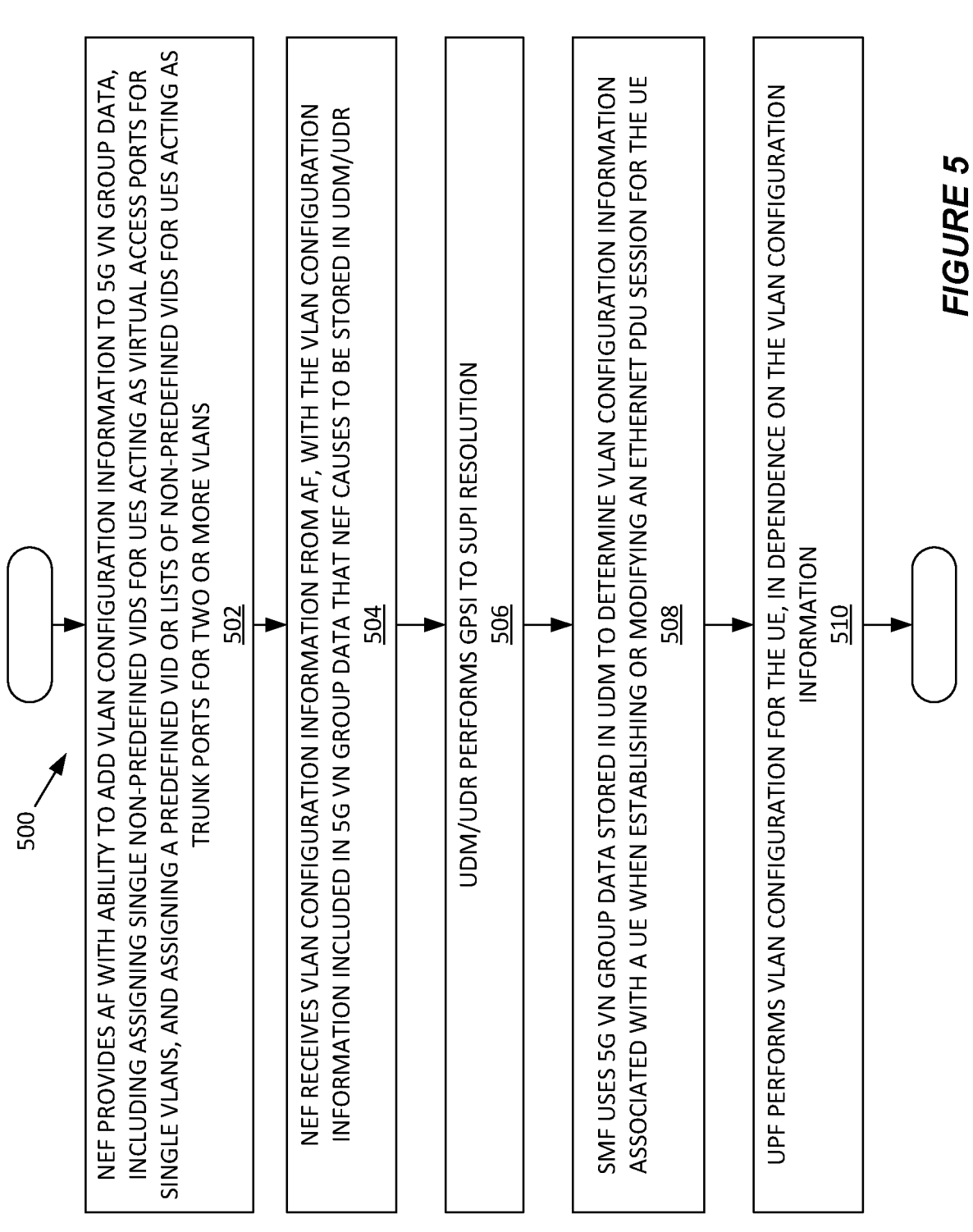

500

NEF PROVIDES AF WITH ABILITY TO ADD VLAN CONFIGURATION INFORMATION TO 5G VN GROUP DATA, INCLUDING ASSIGNING SINGLE NON-PREDEFINED VIDS FOR UES ACTING AS VIRTUAL ACCESS PORTS FOR SINGLE VLANS, AND ASSIGNING A PREDEFINED VID OR LISTS OF NON-PREDEFINED VIDS FOR UES ACTING AS TRUNK PORTS FOR TWO OR MORE VLANS
502

NEF RECEIVES VLAN CONFIGURATION INFORMATION FROM AF, WITH THE VLAN CONFIGURATION INFORMATION INCLUDED IN 5G VN GROUP DATA THAT NEF CAUSES TO BE STORED IN UDM/UDR
504

UDM/UDR PERFORMS GPSI TO SUPI RESOLUTION
506

SMF USES 5G VN GROUP DATA STORED IN UDM TO DETERMINE VLAN CONFIGURATION INFORMATION ASSOCIATED WITH A UE WHEN ESTABLISHING OR MODIFYING AN ETHERNET PDU SESSION FOR THE UE
508

UPF PERFORMS VLAN CONFIGURATION FOR THE UE, IN DEPENDENCE ON THE VLAN CONFIGURATION INFORMATION
510

*FIGURE 5*

METHODS AND APPARATUS SUPPORTING DYNAMIC ETHERNET VLAN CONFIGURATION IN A FIFTH GENERATION SYSTEM

TECHNICAL FIELD

Methods and apparatuses disclosed herein provide for dynamic Virtual Local Area Network (VLAN) configuration in a Fifth Generation System (5GS) providing Ethernet bridging services.

BACKGROUND

Virtual Local Area Network (VLAN) membership can be established either statically or dynamically. Static VLANs are also referred to as port-based VLANs. Static VLAN assignments are created by assigning ports to a VLAN. As a device enters the network, the device automatically assumes the VLAN of the port. If the user changes ports and needs access to the same VLAN, a network administrator must manually make a port-to-VLAN assignment for the new connection.

Dynamic VLANs are created using software or by protocol. With a VLAN Management Policy Server (VMPS), an administrator can assign switch ports to VLANs dynamically based on information such as the source Medium Access Control (MAC) address of the device connected to the port, or the username used to log onto that device. As a device enters the network, the switch queries a database for the VLAN membership of the port to which that device is connected. IEEE 802.1Q defines the Multiple VLAN Registration Protocol (MVRP), which is an application of the Multiple Registration Protocol and allows bridges to negotiate the set of VLANs to be used over a specific link.

A bridge port can be configured in either Access port mode or Trunk port mode for VLAN operation. Access port mode generally is connected to an end-device (e.g., a computer) for access purpose, and a single VLAN is assigned for the access port. Trunk port mode allows ports to transmit and receive data of multiple VLANs; normally, the trunk port mode is used for connection between network devices (bridges, routers).

Specifications promulgated by the Third Generation Partnership Project (3GPP) that define Fifth Generation (5G) telecommunication networks have included some Ethernet support since Release 15. Examples of such support include support for Ethernet Protocol Data Unit (PDU) sessions and MAC learning. Release 16 (Rel 16) and Release 17 (Rel 17) of the 3GPP specifications enhance the support. Rel 16, for example, introduced 5G support for LAN-type services. Rel 16 also specified that a 5G system can be modelled as one or more logical Ethernet bridges, to support integration with Ethernet Time Sensitive Networking (TSN) network. IEEE 802.1Q defines TSN as a standard technology to provide deterministic messaging on standard Ethernet.

With example reference to the Third Generation Partnership Project (3GPP) Technical Specification (TS) 23.502 v17.0.0, 5G Virtual Network (VN) group communication includes one to one communication and one to many communication. One to one communication supports forwarding of unicast traffic between two User Equipments (UEs) within a 5G VN, or between a UE and a device on a Domain Network (DN). One to many communication supports forwarding of multicast traffic and broadcast traffic from one UE (or device on a DN) to many/all UEs within a 5G VN and devices on the DN.

5G VN Group Data can be configured through an Application Function (AF) communicating with a 5G system (5GS) and associated with external group ID(s). See Section 4.15.6.3b of the '502 specification. The 5G VN Group Data can contain: Domain Network Name (DNN), Single Network Slice Selection Assistance Information (S-NSSAI), PDU session type, Application descriptor, and information related with secondary authentication/authorization. An AF configures the 5G VN Group Data together with an external group ID, which may be associated with a list of Generic Public Subscription Identifiers (GPSIs), identifying the UEs that belong to the 5G VN group. See Section 4.15.16.3c of the '502 specification.

There currently exist certain challenge(s). Consider that Section 5.6.10.2 of 3GPP TS 23.501 v17.0.0 specifies that a Session Management Function (SMF) may receive a list of allowed VLAN tags from a Domain Network Authentication, Authorization, and Accounting (DN-AAA) server, for a maximum of 16 VLAN tags, or such tags may be configured locally with allowed VLAN tag values. With local configuration of allowed VLAN tags, the configuration is static and cannot be changed. In the case of the SMF receiving a list of allowed VLAN tags from a DN-AAA, the maximum limit of 16 VLAN tags may be a problem, especially when a User Equipment (UE) is connected to a bridging network and more than 16 VLANs may be needed.

Further, in cases where the SMF receives a list of allowed VLAN tags from a DN-AAA, for a given UE, learning Medium Access Control (MAC) identities requires flooding to all VLAN tags on the list, even if only a few VLANs are active, because each VLAN tag corresponds to a broadcast domain. Flooding with respect to inactive VLANs wastes network resources, nor is the arrangement fully dynamic. Section 5.29.4 of the '501 specification stipulates that, for an Ethernet Protocol Data Unit (PDU) Session, the SMF may instruct the involved User Plane Function(s) (UPFs) to classify frames based on VLAN tags, and to add and remove VLAN tags for frames received and sent on N6 or N19 or internal interfaces ("5G VN internal"). However, the criteria and rules are not specified for classifying frames with different VLAN tags and adding and removing VLAN tag.

Other challenges include the absence of criteria and rules for classifying frames with different VLAN tags and adding and removing VLAN tags. Where and how SMF obtains criteria and rules for VLAN classification, insertion, and deletion remains unsettled. Still further, the relationship between 5G VN groups and VLANs is not specified.

SUMMARY

Methods and apparatuses for a 5G System (5GS) support dynamic and semi-dynamic VLAN configuration for Ethernet bridging services provided by the 5GS. The 5GS includes a node that is configured to receive and store VLAN configuration information for a User Equipment (UE). Particularly, the VLAN configuration information, which comprises a single predefined VLAN ID (VID) or a list of non-predefined VIDs or a single non-predefined VID, may be stored advantageously within 5G Virtual Network (VN) Group Data and indicates whether the UE acts as an Ethernet trunk port or access port. With respect to the 5GS establishing or modifying an Ethernet PDU session for the UE, a User Plane Function (UPF) of the 5GS configures Ethernet bridging operations for the UE as an access port or a trunk port, in dependence on the VLAN configuration information stored for the UE.

Certain aspects of the disclosure and corresponding embodiments may provide solutions to the challenges noted above or for other challenges. Among other things, the disclosed techniques provide a method for a 5GS to support Dynamic VLAN configuration for one or more UEs using an Application Function (AF), e.g., using a group management application programming interface (API). One approach disclosed reuses 5G VN Group Data as defined in the 3GPP specifications to convey VLAN configuration information for a UE to a 5G system via an AF. In such embodiments, the VLAN information is carried inside the 5G VN Group Data, which is identified by an External Group ID. In one or more embodiments, both 5G VN Group Data and an External Group ID are provided to Unified Data Management/ User Data Repository (UDM/UDR) via a Network Exposure Function (NEF). Then, a Session Management Function (SMF) retrieves the VLAN configuration information for a UE and provides it or related control signaling to a User Plane Function (UPF) for VLAN handling. For example, with respect to establishing or modifying an Ethernet PDU session for a UE connected via a 5G System (5GS), the VLAN configuration information comprises one or more VLAN IDs (VIDs), indicating the VLAN association(s) of the UE.

Among the various advantages of the disclosed techniques is providing dynamic VLAN configuration from AFs, along with allowing for flexible dynamic reconfiguration, when needed, nor are there any practical limitations on the size of the allowed VLAN list. The allowed VLAN list may be hosted in an AF, a SMF, or a UPF. For a UE, a N6 or N19 interface used in VLAN trunk port mode, the allowed list can be used together with IEEE802.1 Q Multiple VLAN Registration Protocol (MVRP). MVRP enables the 5GS to learn which VLANs are associated with UEs acting as Ethernet trunk ports. In at least one embodiment, considering an allowed VLAN list for a UE-based port allows the 5GS to determine final allowed active VLANs.

Thus, one aspect of the disclosed techniques is a binding of VLAN groups (e.g., as identified by VIDs) to a 5G VN Group, for a port working in access mode. For trunk ports, a two-step approach is taken. First, a pre-defined 5G VN Group (optionally with a pre-defined VID for the trunk group) is provided via group management API, regardless of how many VLANs are actively used on the port. Second, a SMF or UPF of the 5GS uses the pre-defined group ID or pre-defined VID as an indication of whether the MVRP process is needed. Based on the MVRP results, a list of VLANs that are learned by MVRP will be used for VLAN operations (instead of the pre-defined VID). Another aspect is reusing 5G VN Group Data to convey VLAN configuration information for a UE into the 5G system, so that the dynamic or semi-dynamic VLAN configuration of the 5GS can be carried out by exploiting underlying 3GPP methods.

One embodiment comprises a method performed by one or more network functions (NFs) of a 5GS that provides Ethernet bridging operations for UEs acting as Ethernet access ports or Ethernet trunk ports. The method comprises receiving VLAN configuration information for a UE, where the VLAN configuration information is received from an AF and comprises a predefined VID or a list of non-predefined VIDs if the UE is an Ethernet trunk port, or comprises a single non-predefined VID if the UE is an Ethernet access port. The method further includes storing the VLAN configuration data, for subsequent use by the 5GS in configuring Ethernet bridging operations with respect to the UE.

Another embodiment comprises a 5GS that is configured to provide Ethernet bridging operations for UEs acting as Ethernet access ports or Ethernet trunk ports. The 5GS comprises a network node that includes communication interface circuitry and processing circuitry operatively associated with the communication interface circuitry. The processing circuitry is configured to operate the network node as a NEF that is configured to receive VLAN configuration information for a UE from an AF and store the VLAN configuration information for subsequent use by the 5GS in configuring Ethernet bridging operations with respect to the UE. The VLAN configuration information comprises a predefined VID or a list of non-predefined VIDs if the UE is an Ethernet trunk port, or comprises a single non-predefined VID if the UE is an Ethernet access port.

In one or more embodiments, the VLAN configuration information for a UE is advantageously stored in 5G VN Group Data. Further, in one or more embodiments, using the VLAN configuration information stored for a UE when the 5GS is establishing or modifying an Ethernet PDU session for the UE comprises: in a case where the VLAN configuration information for the UE comprises a single non-predefined VID, configuring Ethernet bridging operations based on the UE being an Ethernet access port associated with a single VLAN identified by the single non-predefined VID; in a case where the VLAN configuration information for the UE comprises a list of non-predefined VIDs, configuring Ethernet bridging operations based on the UE being an Ethernet trunk port associated with multiple VLANs respectively identified by the list of non-predefined VIDs; or, in a case where the VLAN configuration information for the UE comprises a single predefined VID, initiating Multiple VLAN Registration Protocol (MVRP) for the UE, to learn VIDs of VLANs associated with the UE and configuring Ethernet bridging operations based on the UE being an Ethernet trunk port associated with multiple VLANs respectively identified by the learned VIDs.

Running MVRP to learn the VIDs associated with a trunk-port UE may be regarded as performing dynamic VLAN configuration, while configuring bridging operations for a trunk-port UE according to VIDs listed in VLAN configuration stored for the UE may be regarded as performing semi-dynamic VLAN configuration. Related example details include, in cases where the UE acts as an Ethernet trunk port and a list of multiple VLANs are associated with the trunk port, either based on being identified in the VLAN configuration information or being learned via MVRP, a Session Management Function (SMF) or User Plane Function (UPF) of the 5GS may filter the list, e.g., using whitelisting or blacklisting, to determine a filtered list of VLANs that are allowed for the UE and configure bridging operations for the UE accordingly.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 5 is a logic flow diagram of a method of operation in a 5GS for providing dynamic VLAN configuration, according to further example details.

DETAILED DESCRIPTION

Some of the embodiments contemplated herein will now be described more fully with reference to the accompanying drawings. Embodiments are provided by way of example to convey the scope of the subject matter to those skilled in the art.

Figure 1:
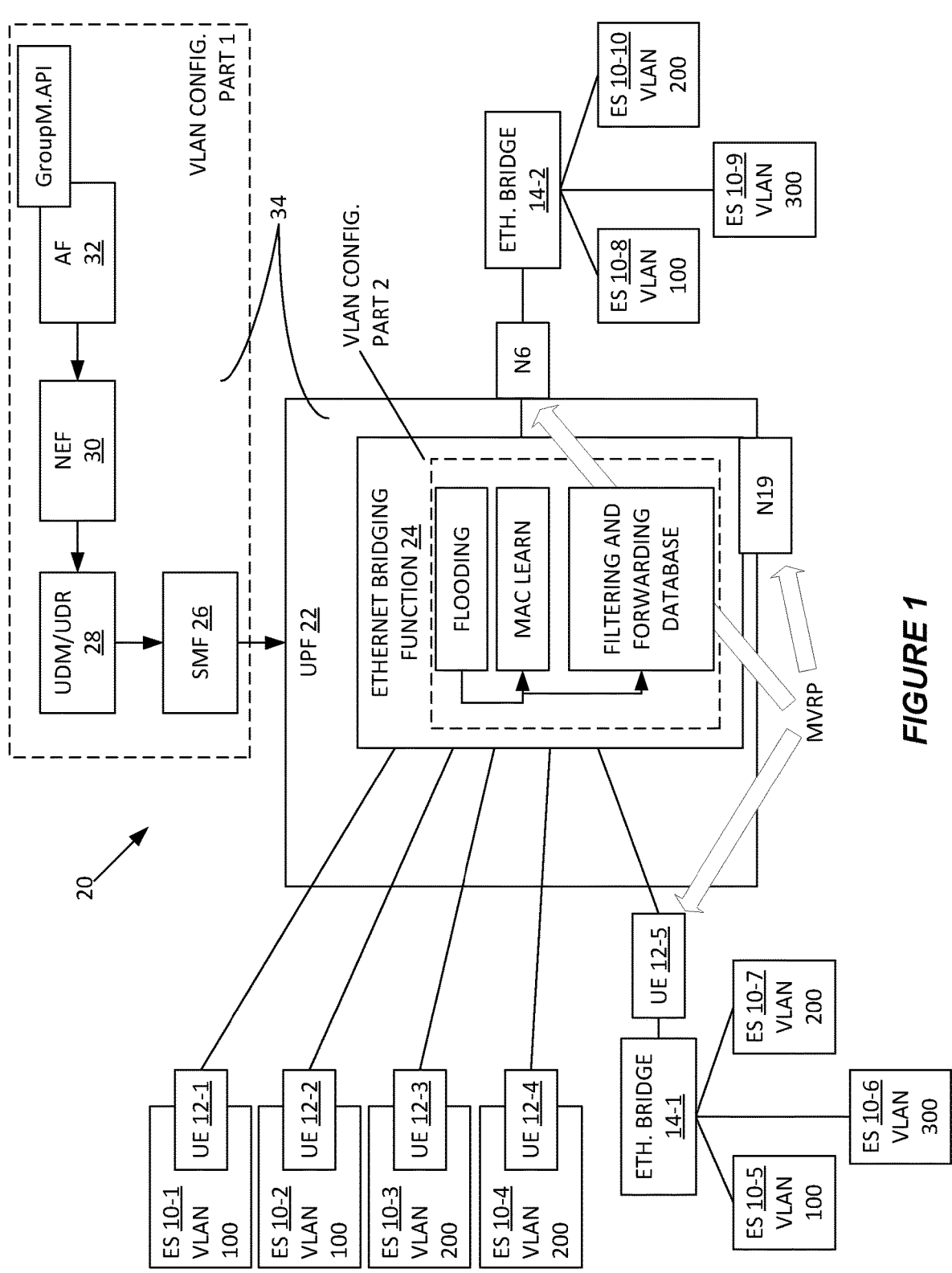
FIG. 1 is a block diagram of a Fifth Generation System (5GS) configured to provide dynamic VLAN configuration services when acting as a logical Ethernet bridge, according to an example embodiment.

Consider an example use case in association with FIG. 1, where there are three Virtual Local Area Network (VLAN) Identifiers (VIDs), representing three different VLANs, denoted as VLAN100, VLAN200, and VLAN300. A number of end stations (ESs) 10 operate in each of the VLANs, where each ES is some form of computing device that supports Ethernet communications. Again, merely as an example for discussion, ES 10-1, ES 10-2, ES 10-5, and ES 10-8 belong to VLAN100, ES 10-3, ES 10-4, ES 10-7, and ES 10-10 belong to VLAN200, and ES 10-6 and 10-9 belong to VLAN300.

ES 10-1 is communicatively connected via a UE 12-1, ES 10-2 is communicatively connected via a UE 12-2, ES 10-3 is communicatively connected via a UE 12-3, ES 10-4 is communicatively connected via a UE 12-4, ESs 10-5, 10-6, and 10-7 are communicatively connected via an Ethernet bridge 14-1, which in turn relies on a UE 12-5 for its communication link, and ESs 10-8, 10-9, and 10-10 are communicatively connected via an Ethernet bridge 14-2, which couples to a Fifth Generation System (5GS) 20 via a N6 interface. ESs 10-1, 10-2, 10-3, and 10-4 coupled to the 5GS 20 via their respective UEs 12, as does the Ethernet bridge 14-1.

The UEs 12 may be embedded in, integrated with, or otherwise associated with their respective ESs 10, and they provide the radio connectivity for wirelessly connecting to the 5GS 20, with the 5GS 20 advantageously providing bridging services for the Ethernet traffic flowing in the respective VLANs.

While the Radio Access Network (RAN) portion of the 5GS 20 is not shown in FIG. 1, one or more radio access nodes, e.g., gNBs, provide the air interface supporting the wireless connections between the UEs 12 and the 5GS 20, which comprises a telecommunication network operating according to the 5G specifications developed by the 3GPP. With respect to the bridging services and the configuration thereof, Network Functions (NFs) of interest in the 5GS 20 include a User Plane Function (UPF) 22, which includes an Ethernet bridging function 24. Additional NFs include a Session Management Function (SMF) 26, a User Data Management (UDM)/User Data Repository (UDR) 28, a Network Exposure Function (NEF) 30, and an Application Function (AF) 32. Any one or more of these NFs may be referred to as NFs 34.

Approaches disclosed herein provide for dynamic or semi-dynamic configuration of VLAN bridges logically implemented in the 5GS 20 and, particularly, provide automated mechanisms for configuring the VID(s) used for processing Ethernet traffic associated with a UE 12 operating as an Ethernet access port or as an Ethernet trunk port. In one or more embodiments, the NEF 30 provides a VLAN group management Application Programming Interface (API) that allows the AF 32 to input VLAN configuration information for individual UEs 12, where the VLAN configuration information for a given UE 12 comprises one or more VIDs. If the UE 12 operates as an Ethernet access port-see the UE 12-1 embedded in the ES 10-1, for example—the VID is the actual VID of the associated VLAN. However, if the UE 12 operates as an Ethernet trunk port-see the UE 12-5 associated with the Ethernet bridge 14-1, for example—the VLAN configuration information comprises a VID that is a special value that is recognized within the 5GS 20 as indicating the trunk port operation, or the VLAN configuration information comprises a list of VIDs, identifying the VLANs that are associated with the trunk port.

Advantageously, when establishing or modifying an Ethernet Protocol Data Unit (PDU) session for a UE 12, the 5GS 20 determines whether the UE 12 acts as an Ethernet access port or as an Ethernet trunk port. In the former case, the 5GS 20 performs Ethernet bridging operations for the UE 12 using the VID stored for the UE 12. In the latter case, if the VLAN configuration information stored for the UE 12 comprises a list of VIDs, the 5GS 20 performs a semi-dynamic VLAN configuration, in which Ethernet bridging operations are configured for the UE 12 according to some or all of the listed VIDs. If the VLAN configuration information stored for the UE 12 comprises the aforementioned special value—i.e., a predefined VID—the 5GS 20 triggers Multiple VLAN Registration Protocol (MVRP) for the UE 12, which allows the 5GS 20 to discover the identities of the VLANs associated with the UE 12 and correspondingly configure the Ethernet bridging operations provided by the 5GS 20 for the UE 12.

In one or more embodiments, the 5GS 20 advantageously reuses or otherwise exploits the 5G Virtual Network (VN) Group Data defined by the Third Generation Partnership Project (3GPP) specifications as the mechanism for carrying and storing VLAN configuration information for individual UEs 12, with, as noted, such information indicating access-port or trunk-port operation of individual UEs 12 and, thus, providing a basis for determining whether MVRP should be triggered for a given UE 12 when the 5GS 20 establishes or modifies an Ethernet PDU session of the UE 12.

According to one or more embodiments disclosed herein, a NEF 30 of the 5GS 20 is configured to receives VLAN configuration information for a UE 12 from an Application Function (AF) 32 and store the VLAN configuration for use by the 5GS 20 when establishing or modifying an Ethernet PDU session for the UE 12. For example, the NEF 30 stores the VLAN configuration information by sending signaling to a UDM/UDR 28 of the 5GS 20, where the signaling indicates the VLAN configuration information. Subsequent use of the VLAN configuration information comprises, for example, a SMF 26 of the 5GS 20 retrieving the VLAN configuration from the UDM/UDR 28 and passing it or related control signaling along to a UPF 22, for use in configuring the Ethernet bridging operations to be performed by the 5GS 20 with respect to the UE 12.

For example, the UPF 22 operates as follows: in a case where the VLAN configuration information for the UE 12 comprises a single non-predefined VID, the UPF 22 configures Ethernet bridging operations based on the UE 12 being an Ethernet access port associated with a single VLAN identified by the single non-predefined VID; or, in a case where the VLAN configuration information for the UE 12 comprises a list of non-predefined VIDs, the UPF 22 configures Ethernet bridging operations based on the UE 12 being an Ethernet trunk port associated with multiple VLANs respectively identified by the list of non-predefined VIDs; or, in a case where the VLAN configuration information for the UE 12 comprises a single predefined VID, the UPF 22 initiates MVRP for the UE 12, to learn VIDs of VLANs associated with the UE 12 and configures Ethernet bridging operations based on the UE 12 being an Ethernet trunk port associated with multiple VLANs respectively identified by the learned VIDs.

A proposed technique of obtaining VLAN configuration information for individual UEs 12 makes use of an Application Programming Interface (API) provided by a NEF 30 of the 5GS 20, by which the NEF 30 enables an Application Function (AF) 32 to enter 5G VN Group Data that includes the VLAN configuration information. Example details on the conventional contents and use of 5G VN Group Data appear in the 3GPP Technical Specifications (TSs) 23.501 v17.0.0 and 23.502 v17.0.0. As explained in the '501 specification, the term "5G VN Group" refers to a set of UEs using private communications for 5G LAN-type service. However, such group operations are tied to the 5G "User Plane" (UP) and Ethernet-based VLANs are defined outside of the 5G UP; thus, use of 5G VN Group Data to carry VIDs and, particularly, to provide a basis for conditional triggering of MVRP for Ethernet UEs 12 represents an advantageous reuse of 5G VN Group Data.

The VLAN related functions described herein can be divided in two parts: one part relates to NEF/AF/UDM/UDR operations and is shown as "VLAN configuration Part 1" in FIG. 1. The other part is shown as "VLAN configuration Part 2" in FIG. 1 and involves SMF/UPF operations.

The VLAN configuration information provided by an AF 32 (i.e., the information associated with VLAN configuration Part 1), needs to be passed to the 5GS 20, so that the 5GS 20 handles the VLANs properly. One aspect of providing for proper VLAN handling by the 5GS 20 is based on using 5G VN Group Data (5G VN configuration parameters) to carry VLAN information into the 5GS 20. There are several options to convey the VLAN configuration information from the operations involved in the "VLAN config. Part 1," with example details given below.

A UE 12 to be used in support of VLAN-based communications carried by the 5GS 20 is assigned to a group depending on the VLAN usage. For each group, there is a unique "external group ID" which is associated with a set of 5G VN Group Data.

In the UDM/UDR 28, the UE subscription information and local identifiers are stored and managed. The 5G VN Group Data inside the UDM/UDR 28 can be provisioned through an AF 32 and a NEF 30 and stored by the NEF 30 in the UDM/UDR 28. Based on such information being stored at the UDM/UDR 28, a SMF 26 in the 5GS 20 that is involved with supporting an Ethernet PDU session of a UE 12 finds out if the PDU session is related to a VLAN group or a trunk group, based on the VLAN configuration information stored for the UE 12 in corresponding 5G VN Group Data. For a UE belonging to one dedicated VLAN group (i.e., the UE acts as an access port of the 5G bridge), the indicated VID value is directly used for VLAN operations such as tagging and filtering. For a UE acting as an Ethernet trunk port, the indicated VID has a special value— i.e., it comprises a predefined VID—and that triggers the SMF 26 and/or UPF 22 to initiate MVRP for the UE, to learn the VLANs with which the UE is associated. That is, the SMF can either instruct the UPF regarding VLAN operation accordingly, or the SMF can pass the VLAN ID value to the UPF, with the UPF then performing VLAN operations.

For a UE in trunk port mode, there can be two options for trunk port configuration: dynamic trunk configuration using MVRP, and semi-dynamic trunk configuration from the AF with group management.

With dynamic trunk configuration using MVRP, the VLAN setting for a trunk port at VLAN config. Part 1 can be either a predefined VLAN value (e.g., 4094) or empty (no VLAN value is assigned). A group can be created for the UEs in trunk mode, a pre-defined "external group ID" can be used to represent the "trunk group". The corresponding 5G VN Group Data can also contain the "pre-defined VLAN ID" for trunk usage.

Based on UDR/UDM information, a SMF may determine that the UE provides trunk-port operation. Either the SMF understands that the VID value stored for the UE is a trunk-port indication, and it correspondingly instructs the involved UPF to perform MVRP, or the SMF passes the predefined VLAN ID to the UPF. In this latter case, the UPF has the logic to understand that the predefined VLAN ID is an indication of trunk port operation, and, therefore, the UPF performs MVRP operation. An allowed VLAN list can be also provided in the 5G VN Group Data, for example, if certain VLANs are reserved for other purposes, and so cannot be used, or for supporting secondary authentication/authorization purposes. The list can be provisioned as part of 5G VN Group Data.

After the VLAN MVRP and filtering based on an "allowed VLAN list", an updated VLAN list for a trunk port can be decided, and the UPF can perform VLAN operations according to updated VLAN list.

Now consider semi-dynamic trunk configuration from AF with group management. Assume the network administrator knows a list of VLANs that are active or will be active for a given trunk port (e.g., a UE operating in trunk mode). Alternatively, another external VLAN configuration server knows the list. In either case, the VLAN ID list can be directly provisioned at the AF, with group management API. Optionally, the trunk VLAN list can be future filtered by checking if any VLAN on the list is on the blacklist of an "allowed VLAN list," e.g., for secondary authentication/authorization purposes.

The VLAN ID list can be carried inside 5G VN group configuration data associated with the trunk group, and then provisioned in the UDM/UDR.

In an example considered in the context of FIG. 1, the administrator knows VLAN ID #100, #200, #300 will be used in connection with UE5. Therefore, the VLAN list contains #100, 200, 300, and can be provided as part of a data set comprising a list of VIDs, in association with VLAN config. Part 1.

Group Data to carry the VLAN ID information. Therefore, even UEs that belong to different trunk groups may still communicate. In this case the traffic forwarding is not controlled by the SMF based on the 5G VN group communication. Instead, communication between different trunk ports is based on the trunk VLAN list. For example, if a UE A acting as trunk port has a list of VLAN 100, 200, 300, the other UE B acting as trunk port has a list of 100, 200, then those two UEs can communicate using VLAN 100 and 200.

The N6 and N19 interfaces normally are used for Ethernet trunk port mode. Therefore, the VLAN configurations for these interfaces can be handled the same way as done for UEs that act as virtual trunk ports.

Several different approaches to using 5G VN Group Data to carry VLAN configuration information—i.e., a VID—for a UE 12 are possible, including modifying the data structure to include a dedicated information field for carrying VLAN configuration information, or, alternatively, "embedding" the VLAN configuration information in a preexisting (currently defined) information field. For example, the VLAN configuration information may be embedded in any one of the following: the Application Descriptor field, the Domain Network Name (DNN) field, or the Single Network Slice Selection Assistance Information (S-NSSAI) field.

The below table illustrates embedded VLAN configuration information as part of the DNN field, where "GPSI" denotes Generic Public Subscription Identifier:

| External GroupID (for VN group creation) | UE GPSI | Type | VLAN ID | 5G VN config. parameter example | |
|---|---|---|---|---|---|
| Group9999@domain.com predefined. Group for VLAN trunk | GPSI#5 | Trunk | None Or a predefined. Value (e.g., 4094) | Allowed VLAN list | DNN: Vlan4094.domain.com |
| Group1@domain.com | GPSI#1 | Access | 100 | | DNN: vlan100.domain.com |
| Group1@domain.com | GPSI#2 | Access | 100 | | |
| Group2@domain.com | GPSI#3 | Access | 200 | | DNN: vlan200.domain.com |
| Group2@domain.com | GPSI#4 | Access | 200 | | |

The VLAN list for UE5 is provisioned to the UDM/UDR, and the SMF retrieves the trunk VLAN list associated with the UE 12-5. The SMF can pass the VLAN ID list to a UPF, and the UPF can then perform VLAN filtering and forwarding operations, which are more generally referred to as VLAN operations. In contrast to the option of using MVRP, another option is to create multiple trunk groups, one for each trunk port, as another UE acting as trunk port may have a completely different trunk VLAN list. For example, if a UE A acting as trunk port has a list of VLAN 100, 200, and 300, and another UE B acting as trunk port has a list of 100, 200, then two trunk groups (trunk group A and trunk group B) may need to be created. The active VLAN list of UE A can be carried in the group data of trunk group A, and the active VLAN list of UE B can be carried in the group data of trunk group B. This approach does not use 5G VN Group Data for traffic forwarding; rather, it only uses the 5G VN In more detail, the above table illustrates an example of using the DNN field defined in the 5G VN Group Data to carry the VLAN configuration information that received by a NEF 30 from an AF 32, for storage in the 5GS 20. Note that the "Type" and "VLAN ID" columns in the above table are not part of the 5G VN Group Data set passed from the AF into the 5GS.

One approach is defining the VLAN group of a given network using a specific prefix of the DNN. That is, the 5G VN Group Data in an example case links the external group IDs (used for VLAN creation) to VIDs by embedding or incorporating VID information into the DNN data field. For example, for VID 100 of domain.com (as the DNN), an example DNN is vlan100.domain.com. This approach effectively puts the VLAN indication in the DNN, which provides for proper configuration and operation of the 5GS 20, for handling VLAN traffic.

A UE in access port mode (e.g., UE 12-1 or UE 12-2) has DNN information in the 5G VN Group Data, the prefix of the DNN (e.g., "vlan100" in the "vlan100.domain.com") indicates which VLAN the UE belongs to.

For a UE in trunk port mode, the VLAN setting in the Part 1 VLAN configuration can be a predefined VID (e.g., the value 4094 or an empty or null value). A group can be created for the UEs in trunk mode, a pre-defined "external group ID" can be used to represent the "trunk group." The corresponding 5G VN data are associated to the "external group id" of the trunk group, where the DNN prefix can indicate "vlan4094".

The below table illustrates the example of embedding the VLAN configuration information in the S-NSSAI field of 5G VN Group Data:

| External GroupID (for VN group creation) | UE GPSI | Type | VLAN ID | 5G VN config. parameter example | | |
|---|---|---|---|---|---|---|
| Group9999@dmain.com predefined Group for VLAN trunk | GPSI#5 | Trunk | None Or a predefined Value (e.g., 4094) | None or predefined for trunk, S-NSSAI (#255) | Allowed VLAN list | DNN: Domain.com |
| Group1@dmain.com | GPSI#1 | Access | 100 | S-NSSAI (#100) | | |
| Group1@dmain.com | GPSI#2 | Access | 100 | S-NSSAI (#100) | | |
| Group2@dmain.com | GPSI#3 | Access | 200 | S-NSSAI (#200) | | |
| Group2@dmain.com | GPSI#4 | Access | 200 | S-NSSAI (#200) | | |

With the approach represented in the table immediately above, the S-NSSAI field of the 5G VN Group Data is used to carry the VLAN configuration information, e.g., from an AF into a UDM/UDR of a 5GS for use by a SMF and/or UPF of the 5GS for performing VLAN operations in support of the 5GS implementing a logical VLAN bridge.

Currently, the 3GPP-defined S-NSSAI may have both a slice service type SST field and a slice differentiator field, corresponding to a S-NSSAI length of 32 bits. The network operator associated with the 5GS can predefine the relationship between S-NSSAIs and VLANs in the UDM/UDR, and a SMF in the 5GS uses that information to derive the VLAN ID information and pass it to a UPF in support of providing VLAN operations in association with a UE that belongs to a VLAN.

The below table illustrates yet another variation or alternative embodiment, wherein VLAN information is embedded in the Application Descriptor field defined in 5G VN Group Data.

Thus, as an alternative to using the domain-name or network slice fields in the 5G VN Group Data to indicate VLAN information, the table immediately above indicates that VLAN configuration information may be carried in the Application Descriptor field of the 5G VN Group Data. With this approach, the AF uses the Application Descriptor filed to pass VLAN configuration information from the AF to the 5GS. The application descriptor for each group indicates the VLAN ID information and may be used to build URSP (UE route selection policy) sent to the group members.

The below table illustrates yet another approach where VLAN IDs are included as individual elements inside 5G VN Group Data—i.e., the 5G VN Group Data is extended with a dedicated information field to carry VLAN configuration information. As currently defined, the data structure for holding 3GPP 5G VN Group Data does not provide for VLAN IDs as separate elements, and one approach disclosed is based on adding such a field to the data structure. With this approach, the 5G VN Group Data provides VLAN provisioning information for storage in the UDM/UDR, which can then be retrieved by a SMF of the 5GS and used by the SMF or the involved UPF to carry out VLAN-related operations.

| External GroupID (for VN group creation) | UE GPSI | Type | 5G VN config. parameter example | | |
|---|---|---|---|---|---|
| Group9999@domain.com predefined. Group for VLAN trunk | GPSI#5 | Trunk | Application descriptor: None or predefined for trunk, e.g., VID#4094 | Allowed VLAN list | Domain.com, S-NSSAI #1 |
| Group1@domain.com | GPSI#1 | Access | Application descriptor: | | Domain.com S-NSSAI#1 |
| Group1@domain.com | GPSI#2 | Access | VID#100 | | Domain.com S-NSSAI#1 |
| Group2@domain.com | GPSI#3 | Access | Application descriptor: | | Domain.com S-NSSAI#1 |
| Group2@domain.com | GPSI#4 | Access | VID#200 | | Domain.com S-NSSAI#1 |

| | | | | 5G VN config. parameter example | | | |
| External GroupID (for VN group creation) | UE GPSI | Type | VLAN ID | Additional info. | DNN | S-NSSAI |
| --- | --- | --- | --- | --- | --- | --- |
| Group9999@dmain.com predefined. Group for VLAN trunk | GPSI#5 | Trunk | None or predefined for trunk, e.g., #4094 | Allowed VLAN list | Domain.com | #1 |
| Group1@dmain.com | GPSI#1 | Access | #100 | | | |
| Group1@dmain.com | GPSI#2 | Access | #100 | | | |
| Group2@dmain.com | GPSI#3 | Access | #200 | | | |
| Group2@dmain.com | GPSI#4 | Access | #200 | | | |

The "Type" column shown above is included as an individual data elements or fields of 5G VN Group Data, in one or more embodiments.

With the above examples in mind, related methods or operations according to one embodiment disclosed herein includes an AF embedding VLAN configuration in the defined data structure used in 3GPP to carry 5G VN Group Data. As a particular example, the 5G VN Group Data structure links group IDs with VLANs, and includes, where appropriate, values or indicators that trigger MVRP operations in the 5GS, for dynamic configuration of a logical VLAN bridge implemented in a UPF of the 5GS. The VLAN configuration information may further include an "allowed VLAN list" that can be used for secondary authentication in the 5GS, e.g., info to the UPF for whitelisting/blacklisting of VLANs.

A network administrator sets up different VLANs for different groupings of end stations, e.g., for different groupings of computers, sensors, controllers, or other nodes that include or are coupled to UEs that communicatively connect the end stations to the 5GS. The administrator assigns respective VLAN IDs to the different groupings, to restrict which end stations are able to communicate with one another.

Consider a case where the administrator knows that a given UE, say UE 12-5, is a trunk port and knows which VLANs will use the trunk port. In such cases, the administrator may input such information as part of the VLAN configuration information and the 5GS does not need to invoke MVRP later during operation.

However, in another case and with reference back to FIG. 1, the administrator knows that UE 12-5 is a trunk port but does not know the associated VLANs that use the trunk. In this case, the VLAN ID linked to the 5G VN Group may be set to a predefined special value or a default value that is operative to trigger the 5GS to perform MVRP, e.g., a UPF supporting UE #5 runs MVRP to discover which VLANs are on the trunk port. Logic to trigger MVRP by the UPF may reside in the SMF. As such, not only do the techniques disclosed herein provide an efficient mechanism to feed VLAN configuration information into a 5GS, e.g., through the use of an AF group management API, the disclosed techniques provide for automatic triggering of MVRP, and corresponding dynamic configuration of trunk ports supported by a logical VLAN bridge implemented in a UPF of the 5GS.

Note that with triggering of MVRP and corresponding dynamic configuration in the 5GS, all trunk ports represented in the VLAN configuration fed into the 5GS via the AF may use the same group identifier, because the 5GS dynamically determines which VLANs are on which trunk ports. In instances where the administrator preconfigures the VLAN IDs that are on respective trunk ports, such precon-figured trunk ports will have different group names in the VLAN configuration data that is set up in the VLAN config. Part 1, shown in the earlier 5GS diagram included herein.

One advantage with the disclosed techniques is that the group names can be arbitrary and the VLAN ID information (known or unknown) is reflected elsewhere in the 5G VN Group Data set. For example, the 5G VN Group Data uses the DNN data field to link VLAN ID with group name. Alternatively, the group names can be linked to VLAN IDs using the S-NSSAI data field or Application Descriptor data field.

Figures 2, 3, 4:
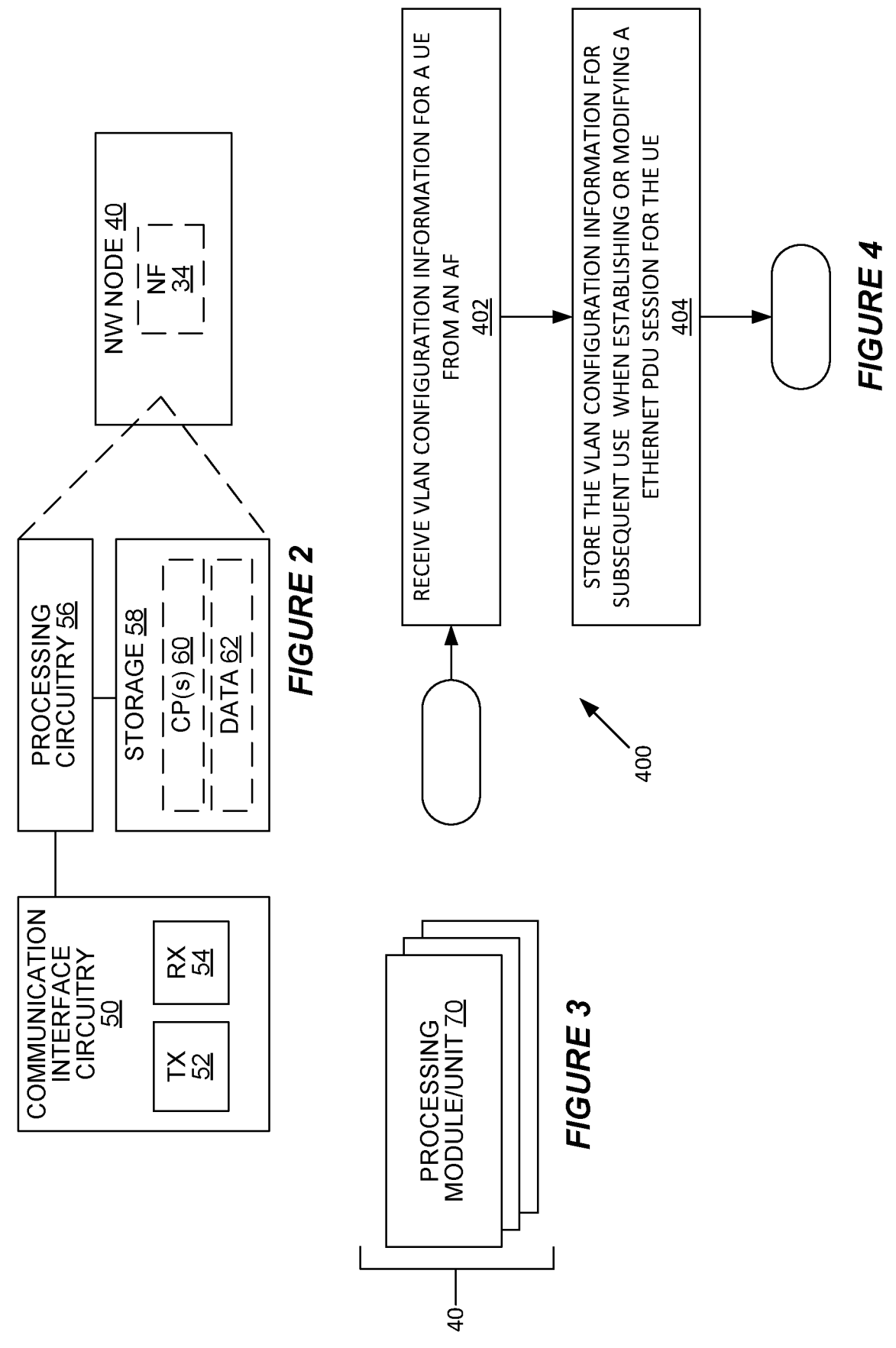
FIG. 2 is a block diagram of a network node of a 5GS, according to an example embodiment.
FIG. 3 is a block diagram of example implementation details for a network node of a 5GS, according to one embodiment.
FIG. 4 is a logic flow diagram of a method of operation in a 5GS for providing dynamic VLAN configuration, according to an example embodiment.

FIG. 2 depicts a network node ("NW NODE") 40 that implements one or more Network Functions (NFs) 34 in or associated with a 5GS 20. For example, the network node 40 implements any one or more of a SMF 26, a UPF 22, a NEF 30, a UDM/UDR 28, or an AF 32. There may multiple computer servers or other computing platforms as example network nodes 40, each implementing one or of the NFs 34 depicted in FIG. 1. As such, any of the nodes/functions in FIG. 1 depicting dynamic VLAN configuration in a 5GS 20 may be implemented according to the example node details depicted in FIG. 2. Of course, the particular NF 34 or functionality implemented by the network node 40 may be determined according to the specifics of the computer program instructions stored in and executed by the processing circuitry of the node.

In more detail, an example network node 40 comprises communication interface circuitry 50, including transmitter circuitry (TX) 52 and receiver circuitry (RX) 54, that is configured to communicatively couple the network node 40 to one or more other nodes in the involved telecommunication network. Such circuitry comprises the physical-medium interface circuitry along with protocol processing—e.g., for implementation of one or more protocols used in or by the telecommunication network for inter-node communications. Non-limiting examples include Ethernet-based interfaces or other data network interfaces. Particulars of the communication interface circuitry depend upon the NF(s) implemented by the network node and the manner in which the network node 40 is implemented, e.g., as a standalone server or as virtualized processing and communication circuitry within a cloud computing center.

The processing circuitry 56 of the depicted network node 40 comprises fixed circuitry or programmatically-configured circuitry or a mix of fixed and programmatically-configured circuitry. Example implementations of the processing circuitry include any one or more of microprocessors, Digital Signal Processors (DSPs), Application Specific Integrated Circuits (ASICs), Field Programmable Gate Arrays (FP-GAs), Complex Programmable Logic Devices (CPLDs), or other digital processing circuitry. In at least one embodiment, one or more microprocessors or other digital processors are specially adapted to operate as the depicted processing circuitry, based on executing computer program instructions stored in the network node.

To that end, in one or more embodiments, storage 58 included in the network node 40 comprises one or more types of computer readable media that provide non-transitory storage of computer program instructions in one or more computer programs ("CP(s)") 60. Here, "non-transitory" does not necessarily mean permanent or unchanging but does connote at least some persistence, such as temporary storage of computer program instructions in working memory for program execution by one or more microprocessors or other digital processors. The storage 58, which may store data 62 (provisioned or working), may include a mix of memory or storage circuits or devices, such as volatile memory for runtime operations—program execution—and non-volatile memory or storage for retention of program instructions and/or data, such as provisioning information, VLAN configuration data, subscriber data, etc. Non-limiting examples of storage include any one or more of SRAM, DRAM, FLASH, EEPROM, Solid State Disk (SSD), and magnetic storage.

In one or more embodiments, a network node 40, or at least the NF(s) provided via the network node 40, is implemented as a number of processing modules or units 70, such as shown in FIG. 3. In at least one embodiment, the processing modules/units 70 can be understood as functional or logical elements realized via programmatic configuration of underlying computer circuitry.

With the above example details in mind, a 5GS 20 according to an example embodiment is configured to provide Ethernet bridging operations for UEs 12 acting as Ethernet access ports or Ethernet trunk ports. The 5GS 20 comprises a network node 40 that includes communication interface circuitry 50 and processing circuitry 56 that is operatively associated with the communication interface circuitry 50 and configured to operate the network node 40 as a NEF 30. Here, the NEF 30 is configured to: (a) include VLAN configuration information in 5G VN Group Data. The VLAN configuration information is received by the NEF 30 from an AF 32 and, for a UE 12 associated with the 5G VN Group Data, comprises a predefined VID if the UE 12 is an Ethernet trunk port, and comprises a non-predefined VID if the UE 12 is an Ethernet access port. A "non-predefined VID" shall be understood as an actual value that identifies the VLAN association of the UE 12, whereas as "predefined VID" shall be understood as a special value, such a pre-agreed value or null value, that indicates trunk operation rather than indicating the VID(s) of actual VLANs.

The NEF 30 is further configured to store the 5G VN Group Data, for subsequent use by the 5GS 20 in determining whether to initiate MVRP for the UE 12 to learn VIDs of VLANs associated with the UE 12, when establishing or modifying an Ethernet PDU session for the UE 12.

In one embodiment, a data structure containing the 5G VN Group Data is extended to include a VID field, and the NEF 30 is configured to include the VLAN configuration information in the 5G VN Group Data by including the VLAN configuration information in the VID field.

The NEF 30 in another embodiment is configured to include the VLAN configuration information in the 5G VN Group Data by embedding the VLAN configuration information in a Domain Network Name (DNN) field that is comprised in the 5G VN Group Data according to 3GPP specifications. See 3GPP TSs 23.501 v17.0.0 and 23.502 v17.0.0.

The NEF 30 in another embodiment is configured to include the VLAN configuration information in the 5G VN Group Data by embedding the VLAN configuration information in an Application Descriptor field that is comprised in the 5G VN Group Data according to the 3GPP specifications.

The NEF 30 in another embodiment is configured to include the VLAN configuration information in the 5G VN Group Data by embedding the VLAN configuration information in a S-NSSAI field that is comprised in the 5G VN Group Data according to the 3GPP specifications.

To receive the VLAN configuration information from an AF 32, the NEF 30 in one or more embodiments is configured to provide a configuration API, which enables the AF 32 to provision the 5G VN Group Data, including the VLAN configuration information.

In one or more embodiments, the NEF 30 is configured to recognize the VLAN configuration information, as received from the AF 32 as part of provisioning the 5G VN Group Data and place the VLAN configuration information in a dedicated data field added to the 5G VN Group Data for carrying the VLAN configuration information. In other embodiments, such as where the VLAN configuration information is embedded with data comprised in a preexisting field of the data structure that carriers the 5G VN Group Data, the VLAN configuration information is transparent to the NEF 30. However, even in such cases, the NEF 30 cooperates with the AF 32 for provisioning of the VLAN configuration information as part of the 5G VN Group Data.

The NEF 30 in an example embodiment is configured to store the 5G VN Group Data for subsequent use by the 5GS 20 by sending signaling indicating the 5G VN Group Data to another node 40 of the 5GS 20 operating as a UDM/UDR 28. That is, saying that the NEF 30 is configured to "store" the 5G VN Group Data may mean that the NEF 30 initiates storage, such as by sending the 5G VN Group Data to another node responsible for holding the 5G VN Group Data.

The 5GS 20 in one or more embodiments further comprises a SMF 26 that is configured to subsequently retrieve the VLAN configuration information from the stored 5G VN Group Data in conjunction with the 5GS 20 establishing or modifying an Ethernet PDU session for the UE 12, and perform one of the following operations: (a) determine from the VLAN configuration information that the UE 12 acts as an Ethernet trunk point and send signaling to a UPF 22 of the 5GS 20, indicating the trunk port determination; or (b) send the VLAN configuration information to the UPF 22, for determination by the UPF 22 as to whether the UE 12 acts as an Ethernet trunk port or an Ethernet access port.

In at least one such embodiment, the UPF 22 of the 5GS 20 is configured to, responsive to the determination that the UE 12 acts as an Ethernet trunk port, initiate MVRP for the UE 12, to learn VIDs of VLANs associated with the UE 12. The UPF 22 in an example embodiment is configured to subsequently perform corresponding Ethernet bridging operations with respect to the Ethernet PDU session of the UE 12, according to the learned VIDs.

FIG. 4 illustrates a method 400 performed by one or more NFs 34 of a 5GS 20 that provides Ethernet bridging operations for UEs 12 acting as Ethernet access ports or Ethernet trunk ports. The method 400 comprises: (a) receiving (Block 402) VLAN configuration information for a UE 12 from an AF 32, and (b) storing (Block 404) the VLAN configuration information, for subsequent use by the 5GS 20 when establishing or modifying an Ethernet PDU session for the UE 12. Receiving the VLAN configuration information comprises, for example, receiving the VLAN configuration information as part of or for inclusion in 5G VN Group Data, e.g., a NEF 30 of the 5GS 20 provides an API that enables the AF 32 to input the VLAN configuration into the 5G VN Group Data. In one or more embodiments, the VLAN configuration information comprises one of: a special value—i.e., a predefined VID—that is used to trigger the 5GS 20 to initiate MVRP for the UE 12, to learn the VLANs associated with the UE 12 for trunk port operation; or a list of non-predefined VIDs that identify the VLANs associated with the UE 12 for trunk port operation; or a single non-predefined VID that identifies the VLAN associated with the UE 12 for access port operation.

FIG. 5 illustrates a method 500 by a collection of NFs 34 comprised in a 5GS 20, for dynamic VLAN configuration, which can be understood as a collection of operations performed by different NFs 34, according to at least one embodiment of the method 400.

The method 500 comprises a NEF 30 providing an AF 32 with the ability to configured dynamic VLAN configuration information for UEs 12, e.g., by providing an API that enables the AF 32 to add VLAN configuration for UEs 12 to 5G VN Group Data (Block 502). In this context, the AF 32 assigns single non-predefined VIDs for UEs 12 acting as Ethernet access ports ("virtual Access Ports" or "vAPs") for single VLANs. For a UE 12 acting as a trunk port for two or more VLANs, the AF 32 assigns a predefined VID or a list of non-predefined VIDs that identify the VLANs associated with trunk port operation of the UE 12. Assigning the non-predefined VID will cause the 5GS 20 to later trigger MVRP for the UE 12, to learn the VLANs associated with the UE 12. The method 500 further includes the NEF 30 providing (Block 504) the VLAN configuration information to a UDM/UDR 28.

Still further, the method 500 includes the UDM/UDR 28 performing (Block 506) GPSI to Subscription Permanent Identifier (SUPI) resolution (to associate VLAN information with the SUPI(s)), with respect to UEs 12 represented in the VLAN configuration information included in 5G VN Group Data stored in the UDM/UDR 28, and an SFM 26 determining (retrieving) the VLAN configuration information for a given UE 12, when establishing or modifying an Ethernet PDU session for the UE 12. Correspondingly, the method 500 includes the UPF 22 performing (Block 510) VLAN configuration for the UE 12, in dependence on the VLAN configuration information retrieved for the UE 12.

Figure 6:
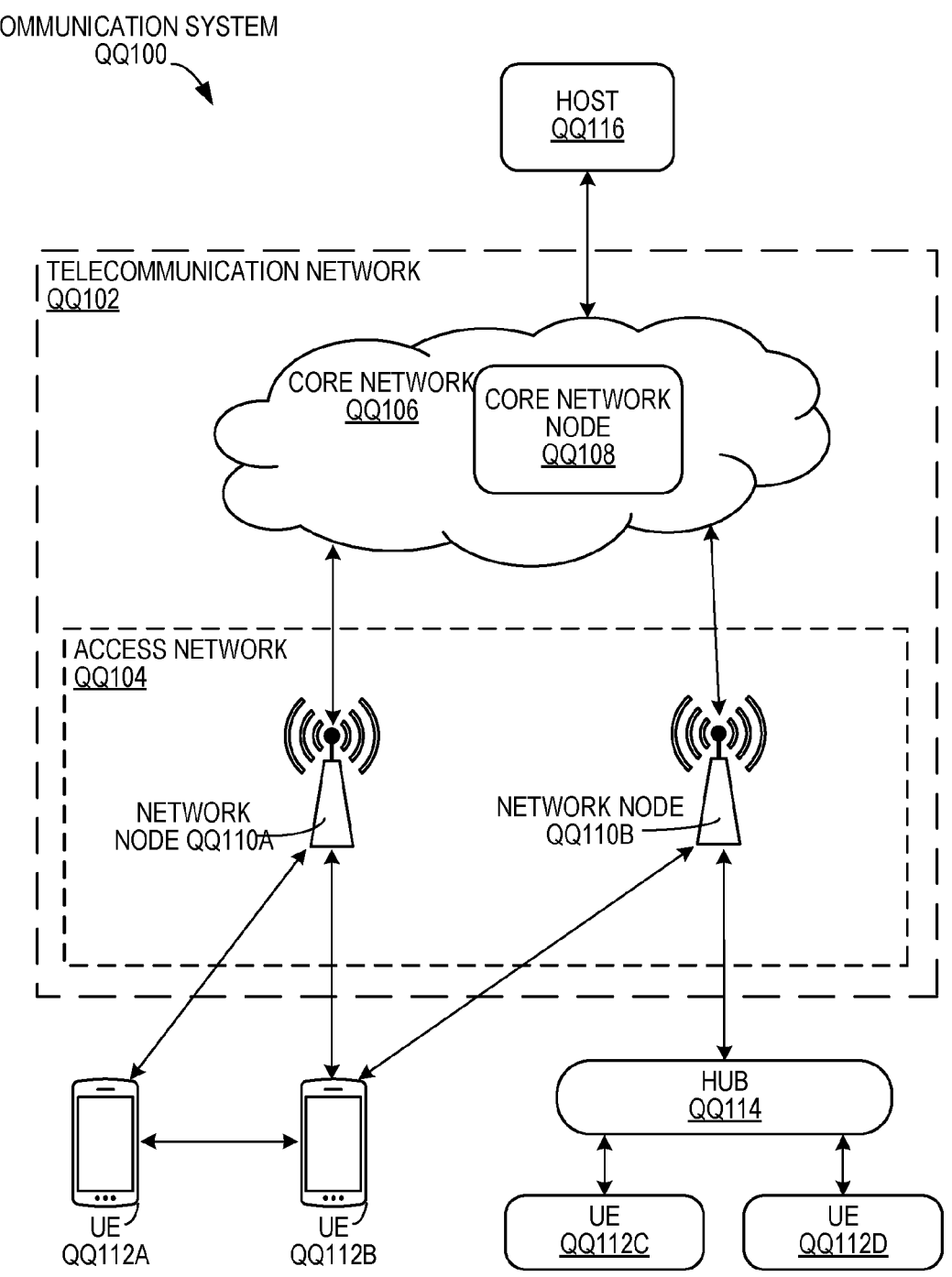
FIG. 6 is a block diagram of a communication system, according to an example embodiment.

To consider further example embodiments, FIG. 6 shows an example of a communication system QQ100 in accordance with some embodiments. The communication system QQ100 can be understood as a depiction of a 5GS that is configured to 5G VN Group Data to carry VLAN configuration information for a UE 12, and further configured to use that information to trigger MVRP for the UE 12 on a conditional basis, when establishing or modifying an Ethernet PDU session for the UE 12.

In the example, the communication system QQ100 includes a telecommunication network QQ102 that includes an access network QQ104, such as a radio access network (RAN), and a core network QQ106, which includes one or more core network nodes QQ108. The access network QQ104 includes one or more access network nodes, such as network nodes QQ110a and QQ110b (one or more of which may be generally referred to as network nodes QQ110), or any other similar 3rd Generation Partnership Project (3GPP) access node or non-3GPP access point. The network nodes QQ110 facilitate direct or indirect connection of user equipment (UE), such as by connecting UEs QQ112a, QQ112b, QQ112c, and QQ112d (one or more of which may be generally referred to as UEs QQ112) to the core network QQ106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system QQ100 may include any number of wired or wireless networks, network nodes, UEs, and/or any other components or systems that may facilitate or participate in the communication of data and/or signals whether via wired or wireless connections. The communication system QQ100 may include and/or interface with any type of communication, telecommunication, data, cellular, radio network, and/or other similar type of system.

The UEs QQ112 may be any of a wide variety of communication devices, including wireless devices arranged, configured, and/or operable to communicate wirelessly with the network nodes QQ110 and other communication devices. Similarly, the network nodes QQ110 are arranged, capable, configured, and/or operable to communicate directly or indirectly with the UEs QQ112 and/or with other network nodes or equipment in the telecommunication network QQ102 to enable and/or provide network access, such as wireless network access, and/or to perform other functions, such as administration in the telecommunication network QQ102.

In the depicted example, the core network QQ106 connects the network nodes QQ110 to one or more hosts, such as host QQ116. These connections may be direct or indirect via one or more intermediary networks or devices. In other examples, network nodes may be directly coupled to hosts. The core network QQ106 includes one more core network nodes (e.g., core network node QQ108) that are structured with hardware and software components. Features of these components may be substantially similar to those described with respect to the UEs, network nodes, and/or hosts, such that the descriptions thereof are generally applicable to the corresponding components of the core network node QQ108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host QQ116 may be under the ownership or control of a service provider other than an operator or provider of the access network QQ104 and/or the telecommunication network QQ102 and may be operated by the service provider or on behalf of the service provider. The host QQ116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system QQ100 of Figure QQ1 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (Wi-Fi); and/or any other appropriate wireless communication standard, such as the Worldwide Interoperability for Microwave Access (WiMAX), Bluetooth, Z-Wave, Near Field Communication (NFC) ZigBee, LiFi, and/or any low-power wide-area network (LPWAN) standards such as LoRa and Sigfox.

In some examples, the telecommunication network QQ102 is a cellular network that implements 3GPP standardized features. Accordingly, the telecommunications network QQ102 may support network slicing to provide different logical networks to different devices that are connected to the telecommunication network QQ102. For example, the telecommunications network QQ102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs QQ112 are configured to transmit and/or receive information without direct human interaction. For instance, a UE may be designed to transmit information to the access network QQ104 on a predetermined schedule, when triggered by an internal or external event, or in response to requests from the access network QQ104. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub QQ114 communicates with the access network QQ104 to facilitate indirect communication between one or more UEs (e.g., UE QQ112c and/or QQ112d) and network nodes (e.g., network node QQ110b). In some examples, the hub QQ114 may be a controller, router, content source and analytics, or any of the other communication devices described herein regarding UEs. For example, the hub QQ114 may be a broadband router enabling access to the core network QQ106 for the UEs. As another example, the hub QQ114 may be a controller that sends commands or instructions to one or more actuators in the UEs. Commands or instructions may be received from the UEs, network nodes QQ110, or by executable code, script, process, or other instructions in the hub QQ114. As another example, the hub QQ114 may be a data collector that acts as temporary storage for UE data and, in some embodiments, may perform analysis or other processing of the data. As another example, the hub QQ114 may be a content source. For example, for a UE that is a VR headset, display, loudspeaker or other media delivery device, the hub QQ114 may retrieve VR assets, video, audio, or other media or data related to sensory information via a network node, which the hub QQ114 then provides to the UE either directly, after performing local processing, and/or after adding additional local content. In still another example, the hub QQ114 acts as a proxy server or orchestrator for the UEs, in particular in if one or more of the UEs are low energy IoT devices.

The hub QQ114 may have a constant/persistent or intermittent connection to the network node QQ110b. The hub QQ114 may also allow for a different communication scheme and/or schedule between the hub QQ114 and UEs (e.g., UE QQ112c and/or QQ112d), and between the hub QQ114 and the core network QQ106. In other examples, the hub QQ114 is connected to the core network QQ106 and/or one or more UEs via a wired connection. Moreover, the hub QQ114 may be configured to connect to an M2M service provider over the access network QQ104 and/or to another UE over a direct connection. In some scenarios, UEs may establish a wireless connection with the network nodes QQ110 while still connected via the hub QQ114 via a wired or wireless connection. In some embodiments, the hub QQ114 may be a dedicated hub—that is, a hub whose primary function is to route communications to/from the UEs from/to the network node QQ110b. In other embodiments, the hub QQ114 may be a non-dedicated hub—that is, a device which is capable of operating to route communications between the UEs and network node QQ110b, but which is additionally capable of operating as a communication start and/or end point for certain data channels.

In one or more embodiments, the telecommunication network QQ102 provides one or more logical bridges for use in VLAN-based communications. For example, one or more network nodes/NFs implemented in the core network QQ106 and/or elsewhere within the network QQ102 implement the dynamic VLAN configuration techniques disclosed herein.

Figure 7:
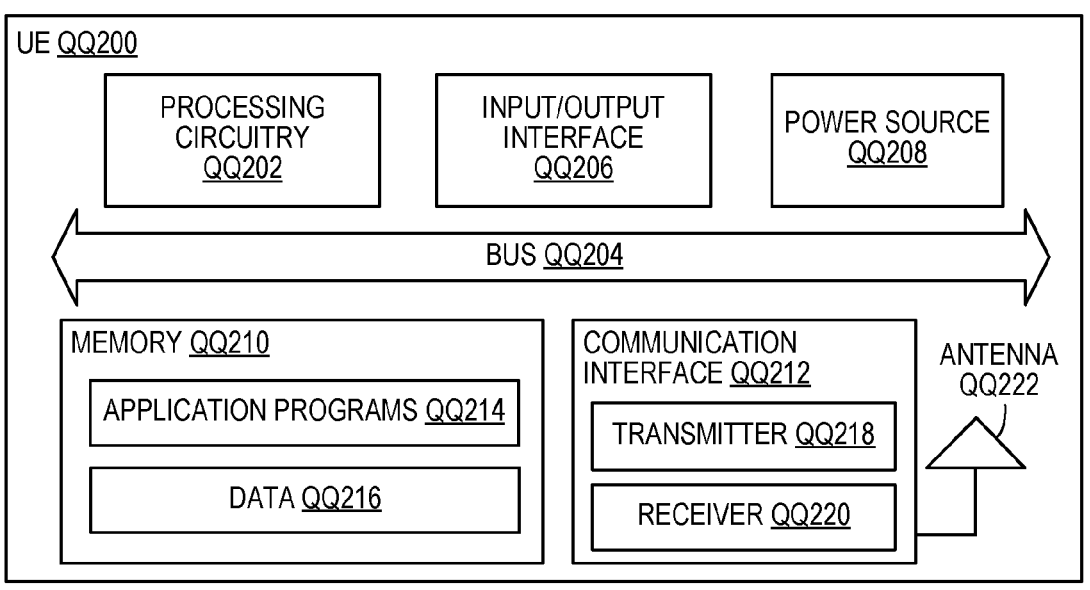
FIG. 7 is a block diagram of a User Equipment (UE), according to an example embodiment.

FIG. 7 shows a UE QQ200 in accordance with some embodiments. As used herein, a UE refers to a device capable, configured, arranged and/or operable to communicate wirelessly with network nodes and/or other UEs. In an example context, the UE QQ200 operates either as an access port for a single VLAN or as a trunk port for multiple VLANs and provides connectivity for Ethernet traffic into and out of a 5GS 20 acting as an Ethernet bridge for such traffic.

Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE QQ200 includes processing circuitry QQ202 that is operatively coupled via a bus QQ204 to an input/output interface QQ206, a power source QQ208, a memory QQ210, a communication interface QQ212, and/or any other component, or any combination thereof. Certain UEs may utilize all or a subset of the components shown in FIG. 7. The level of integration between the components may vary from one UE to another UE. Further, certain UEs may contain multiple instances of a component, such as multiple processors, memories, transceivers, transmitters, receivers, etc.

The processing circuitry QQ202 is configured to process instructions and data and may be configured to implement any sequential state machine operative to execute instructions stored as machine-readable computer programs in the memory QQ210. The processing circuitry QQ202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry QQ202 may include multiple central processing units (CPUs).

In the example, the input/output interface QQ206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE QQ200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source QQ208 is structured as a battery or battery pack. Other types of power sources, such as an external power source (e.g., an electricity outlet), photovoltaic device, or power cell, may be used. The power source QQ208 may further include power circuitry for delivering power from the power source QQ208 itself, and/or an external power source, to the various parts of the UE QQ200 via input circuitry or an interface such as an electrical power cable. Delivering power may be, for example, for charging of the power source QQ208. Power circuitry may perform any formatting, converting, or other modification to the power from the power source QQ208 to make the power suitable for the respective components of the UE QQ200 to which power is supplied.

The memory QQ210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory QQ210 includes one or more application programs QQ214, such as an operating system, web browser application, a widget, gadget engine, or other application, and corresponding data QQ216. The memory QQ210 may store, for use by the UE QQ200, any of a variety of various operating systems or combinations of operating systems.

The memory QQ210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory QQ210 may allow the UE QQ200 to access instructions, application programs and the like, stored on transitory or non-transitory memory media, to off-load data, or to upload data. An article of manufacture, such as one utilizing a communication system may be tangibly embodied as or in the memory QQ210, which may be or comprise a device-readable storage medium.

The processing circuitry QQ202 may be configured to communicate with an access network or other network using the communication interface QQ212. The communication interface QQ212 may comprise one or more communication subsystems and may include or be communicatively coupled to an antenna QQ222. The communication interface QQ212 may include one or more transceivers used to communicate, such as by communicating with one or more remote transceivers of another device capable of wireless communication (e.g., another UE or a network node in an access network). Each transceiver may include a transmitter QQ218 and/or a receiver QQ220 appropriate to provide network communications (e.g., optical, electrical, frequency allocations, and so forth). Moreover, the transmitter QQ218 and receiver QQ220 may be coupled to one or more antennas (e.g., antenna QQ222) and may share circuit components, software or firmware, or alternatively be implemented separately.

In the illustrated embodiment, communication functions of the communication interface QQ212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMAX, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface QQ212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE QQ200 shown in FIG. 7.

As yet another specific example, in an IoT scenario, a UE may represent a machine or other device that performs monitoring and/or measurements and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 8:
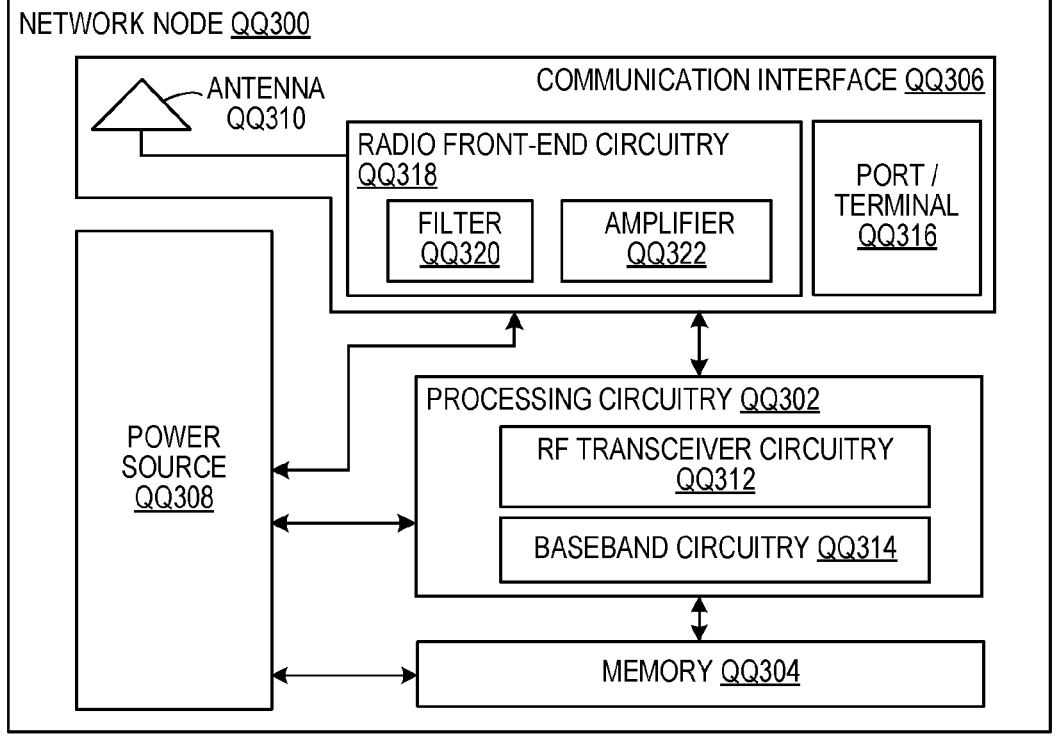
FIG. 8 is a block diagram of a network node, according to an example embodiment.

FIG. 8 shows a network node QQ300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs), and/or Minimization of Drive Tests (MDTs).

The network node QQ300 includes a processing circuitry QQ302, a memory QQ304, a communication interface QQ306, and a power source QQ308. The network node QQ300 may be composed of multiple physically separate components (e.g., a NodeB component and a RNC component, or a BTS component and a BSC component, etc.), which may each have their own respective components. In certain scenarios in which the network node QQ300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node QQ300 may be configured to support multiple radio access technologies (RATs). In such embodiments, some components may be duplicated (e.g., separate memory QQ304 for different RATs) and some components may be reused (e.g., a same antenna QQ310 may be shared by different RATs). The network node QQ300 may also include multiple sets of the various illustrated components for different wireless technologies integrated into network node QQ300, for example GSM, WCDMA, LTE, NR, Wi-Fi, Zigbee, Z-wave, LoRaWAN, Radio Frequency Identification (RFID) or Bluetooth wireless technologies. These wireless technologies may be integrated into the same or different chip or set of chips and other components within network node QQ300.

The processing circuitry QQ302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ300 components, such as the memory QQ304, to provide network node QQ300 functionality.

In some embodiments, the processing circuitry QQ302 includes a system on a chip (SOC). In some embodiments, the processing circuitry QQ302 includes one or more of radio frequency (RF) transceiver circuitry QQ312 and baseband processing circuitry QQ314. In some embodiments, the radio frequency (RF) transceiver circuitry QQ312 and the baseband processing circuitry QQ314 may be on separate chips (or sets of chips), boards, or units, such as radio units and digital units. In alternative embodiments, part or all of RF transceiver circuitry QQ312 and baseband processing circuitry QQ314 may be on the same chip or set of chips, boards, or units.

The memory QQ304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry QQ302. The memory QQ304 may store any suitable instructions, data, or information, including a computer program, software, an application including one or more of logic, rules, code, tables, and/or other instructions capable of being executed by the processing circuitry QQ302 and utilized by the network node QQ300. The memory QQ304 may be used to store any calculations made by the processing circuitry QQ302 and/or any data received via the communication interface QQ306. In some embodiments, the processing circuitry QQ302 and memory QQ304 is integrated.

The communication interface QQ306 is used in wired or wireless communication of signaling and/or data between a network node, access network, and/or UE. As illustrated, the communication interface QQ306 comprises port(s)/terminal(s) QQ316 to send and receive data, for example to and from a network over a wired connection. The communication interface QQ306 also includes radio front-end circuitry QQ318 that may be coupled to, or in certain embodiments a part of, the antenna QQ310. Radio front-end circuitry QQ318 comprises filters QQ320 and amplifiers QQ322. The radio front-end circuitry QQ318 may be connected to an antenna QQ310 and processing circuitry QQ302. The radio front-end circuitry may be configured to condition signals communicated between antenna QQ310 and processing circuitry QQ302. The radio front-end circuitry QQ318 may receive digital data that is to be sent out to other network nodes or UEs via a wireless connection. The radio front-end circuitry QQ318 may convert the digital data into a radio signal having the appropriate channel and bandwidth parameters using a combination of filters QQ320 and/or amplifiers QQ322. The radio signal may then be transmitted via the antenna QQ310. Similarly, when receiving data, the antenna QQ310 may collect radio signals which are then converted into digital data by the radio front-end circuitry QQ318. The digital data may be passed to the processing circuitry QQ302. In other embodiments, the communication interface may comprise different components and/or different combinations of components.

In certain alternative embodiments, the network node QQ300 does not include separate radio front-end circuitry QQ318, instead, the processing circuitry QQ302 includes radio front-end circuitry and is connected to the antenna QQ310. Similarly, in some embodiments, all or some of the RF transceiver circuitry QQ312 is part of the communication interface QQ306. In still other embodiments, the communication interface QQ306 includes one or more ports or terminals QQ316, the radio front-end circuitry QQ318, and the RF transceiver circuitry QQ312, as part of a radio unit (not shown), and the communication interface QQ306 communicates with the baseband processing circuitry QQ314, which is part of a digital unit (not shown).

The antenna QQ310 may include one or more antennas, or antenna arrays, configured to send and/or receive wireless signals. The antenna QQ310 may be coupled to the radio front-end circuitry QQ318 and may be any type of antenna capable of transmitting and receiving data and/or signals wirelessly. In certain embodiments, the antenna QQ310 is separate from the network node QQ300 and connectable to the network node QQ300 through an interface or port.

The antenna QQ310, communication interface QQ306, and/or the processing circuitry QQ302 may be configured to perform any receiving operations and/or certain obtaining operations described herein as being performed by the network node. Any information, data and/or signals may be received from a UE, another network node and/or any other network equipment. Similarly, the antenna QQ310, the communication interface QQ306, and/or the processing circuitry QQ302 may be configured to perform any transmitting operations described herein as being performed by the network node. Any information, data and/or signals may be transmitted to a UE, another network node and/or any other network equipment.

The power source QQ308 provides power to the various components of network node QQ300 in a form suitable for the respective components (e.g., at a voltage and current level needed for each respective component). The power source QQ308 may further comprise, or be coupled to, power management circuitry to supply the components of the network node QQ300 with power for performing the functionality described herein. For example, the network node QQ300 may be connectable to an external power source (e.g., the power grid, an electricity outlet) via an input circuitry or interface such as an electrical cable, whereby the external power source supplies power to power circuitry of the power source QQ308. As a further example, the power source QQ308 may comprise a source of power in the form of a battery or battery pack which is connected to, or integrated in, power circuitry. The battery may provide backup power should the external power source fail.

Embodiments of the network node QQ300 may include additional components beyond those shown in FIG. 8 for providing certain aspects of the network node's functionality, including any of the functionality described herein and/or any functionality necessary to support the subject matter described herein. For example, the network node QQ300 may include user interface equipment to allow input of information into the network node QQ300 and to allow output of information from the network node QQ300. This may allow a user to perform diagnostic, maintenance, repair, and other administrative functions for the network node QQ300.

Figure 9:
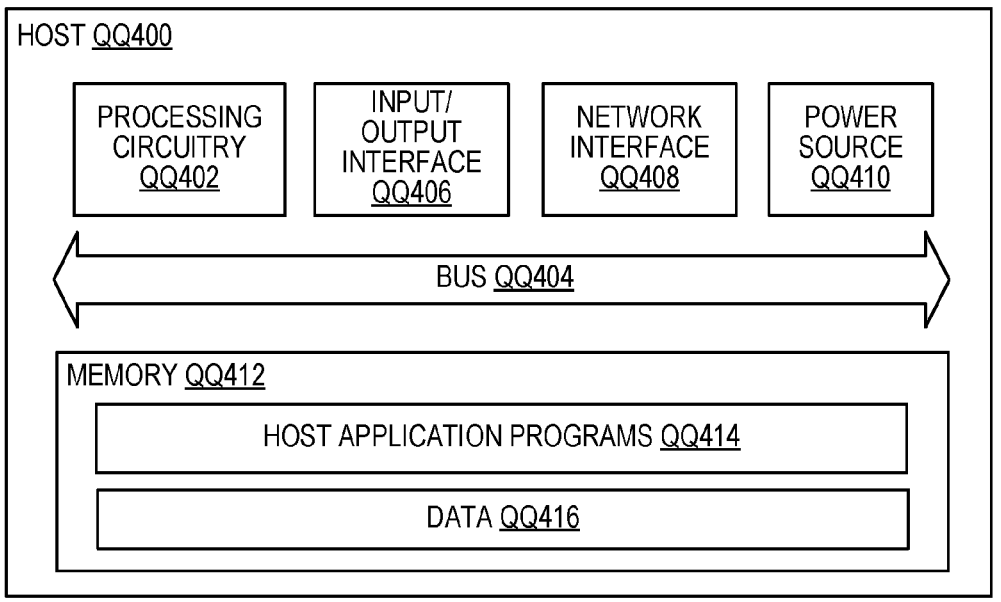
FIG. 9 is a block diagram of a host, according to an example embodiment.

FIG. 9 is a block diagram of a host QQ400, which may be an embodiment of the host QQ116 of FIG. 6, in accordance with various aspects described herein. As used herein, the host QQ400 may be or comprise various combinations hardware and/or software, including a standalone server, a blade server, a cloud-implemented server, a distributed server, a virtual machine, container, or processing resources in a server farm. The host QQ400 may provide one or more services to one or more UEs.

The host QQ400 includes processing circuitry QQ402 that is operatively coupled via a bus QQ404 to an input/output interface QQ406, a network interface QQ408, a power source QQ410, and a memory QQ412. Other components may be included in other embodiments. Features of these components may be substantially similar to those described with respect to the devices of previous figures, such as FIGS. 7 and 8, such that the descriptions thereof are generally applicable to the corresponding components of host QQ400.

The memory QQ412 may include one or more computer programs including one or more host application programs QQ414 and data QQ416, which may include user data, e.g., data generated by a UE for the host QQ400, or data generated by the host QQ400 for a UE. Embodiments of the host QQ400 may utilize only a subset, or all of the components shown. The host application programs QQ414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs QQ414 may also provide for user authentication and licensing checks and may periodically report health, routes, and content availability to a central node, such as a device in or on the edge of a core network. Accordingly, the host QQ400 may select and/or indicate a different host for over-the-top services for a UE. The host application programs QQ414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 10:
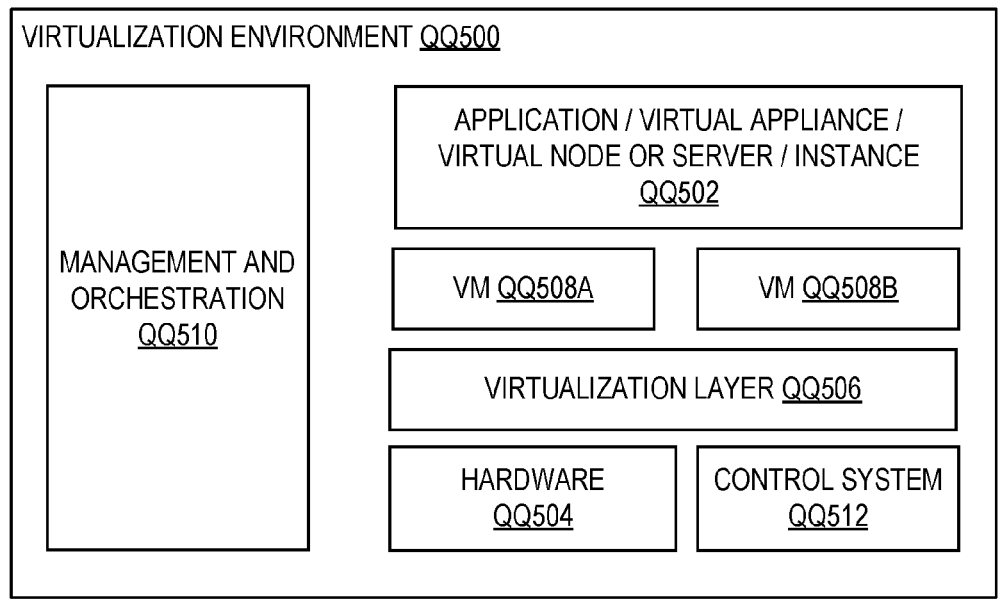
FIG. 10 is a block diagram of a virtualization environment, according to an example embodiment.

FIG. 10 is a block diagram illustrating a virtualization environment QQ500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments QQ500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications QQ502 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware QQ504 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers QQ506 (also referred to as hypervisors or virtual machine monitors (VMMs)), provide VMs QQ508a and QQ508b (one or more of which may be generally referred to as VMs QQ508), and/or perform any of the functions, features and/or benefits described in relation with some embodiments described herein. The virtualization layer QQ506 may present a virtual operating platform that appears like networking hardware to the VMs QQ508.

The VMs QQ508 comprise virtual processing, virtual memory, virtual networking or interface and virtual storage, and may be run by a corresponding virtualization layer QQ506. Different embodiments of the instance of a virtual appliance QQ502 may be implemented on one or more of VMs QQ508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM QQ508 may be a software implementation of a physical machine that runs programs as if they were executing on a physical, non-virtualized machine. Each of the VMs QQ508, and that part of hardware QQ504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs QQ508 on top of the hardware QQ504 and corresponds to the application QQ502.

Hardware QQ504 may be implemented in a standalone network node with generic or specific components. Hardware QQ504 may implement some functions via virtualization. Alternatively, hardware QQ504 may be part of a larger cluster of hardware (e.g., such as in a data center or CPE) where many hardware nodes work together and are managed via management and orchestration QQ510, which, among others, oversees lifecycle management of applications QQ502. In some embodiments, hardware QQ504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system QQ512 which may alternatively be used for communication between hardware nodes and radio units.

Figure 11:
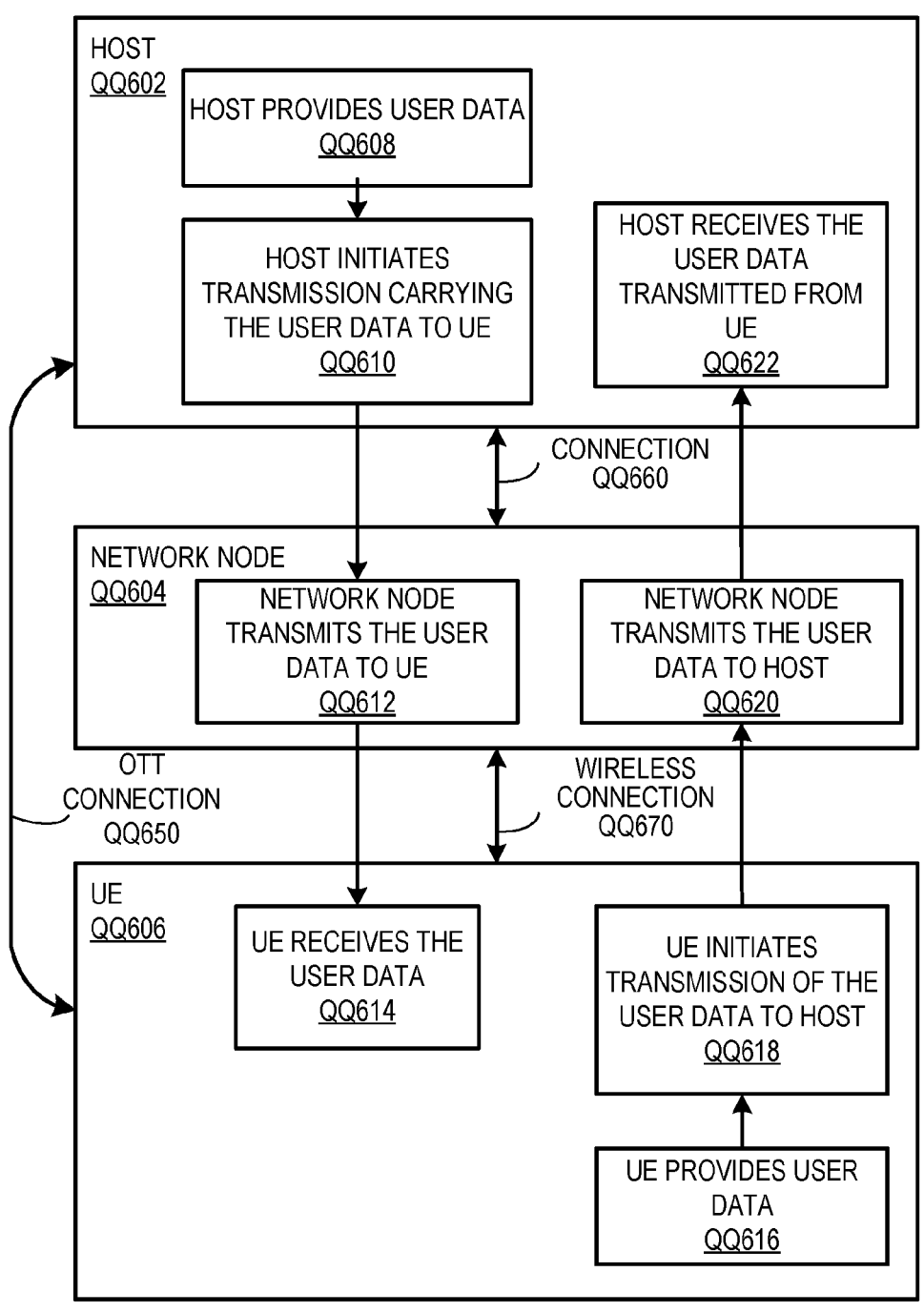
FIG. 11 is a block diagram of a host, a network node, and a UE, and communications therebetween, according to an example embodiment.

FIG. 11 shows a communication diagram of a host QQ602 communicating via a network node QQ604 with a UE QQ606 over a partially wireless connection in accordance with some embodiments. Example implementations, in accordance with various embodiments, of the UE (such as a UE QQ112*a* of FIG. 6 and/or UE QQ200 of FIG. 7), network node (such as network node QQ110*a* of FIG. 6 and/or network node QQ300 of FIG. 8), and host (such as host QQ116 of FIG. 6 and/or host QQ400 of FIG. 9) discussed in the preceding paragraphs will now be described with reference to FIG. 11.

Like host QQ400, embodiments of host QQ602 include hardware, such as a communication interface, processing circuitry, and memory. The host QQ602 also includes software, which is stored in or accessible by the host QQ602 and executable by the processing circuitry. The software includes a host application that may be operable to provide a service to a remote user, such as the UE QQ606 connecting via an over-the-top (OTT) connection QQ650 extending between the UE QQ606 and host QQ602. In providing the service to the remote user, a host application may provide user data which is transmitted using the OTT connection QQ650.

The network node QQ604 includes hardware enabling it to communicate with the host QQ602 and UE QQ606. The connection QQ660 may be direct or pass through a core network (like core network QQ106 of FIG. 6) and/or one or more other intermediate networks, such as one or more public, private, or hosted networks. For example, an intermediate network may be a backbone network or the Internet.

The UE QQ606 includes hardware and software, which is stored in or accessible by UE QQ606 and executable by the UE's processing circuitry. The software includes a client application, such as a web browser or operator-specific "app" that may be operable to provide a service to a human or non-human user via UE QQ606 with the support of the host QQ602. In the host QQ602, an executing host application may communicate with the executing client application via the OTT connection QQ650 terminating at the UE QQ606 and host QQ602. In providing the service to the user, the UE's client application may receive request data from the host's host application and provide user data in response to the request data. The OTT connection QQ650 may transfer both the request data and the user data. The UE's client application may interact with the user to generate the user data that it provides to the host application through the OTT connection QQ650.

The OTT connection QQ650 may extend via a connection QQ660 between the host QQ602 and the network node QQ604 and via a wireless connection QQ670 between the network node QQ604 and the UE QQ606 to provide the connection between the host QQ602 and the UE QQ606. The connection QQ660 and wireless connection QQ670, over which the OTT connection QQ650 may be provided, have been drawn abstractly to illustrate the communication between the host QQ602 and the UE QQ606 via the network node QQ604, without explicit reference to any intermediary devices and the precise routing of messages via these devices.

As an example of transmitting data via the OTT connection QQ650, in step QQ608, the host QQ602 provides user data, which may be performed by executing a host application. In some embodiments, the user data is associated with a particular human user interacting with the UE QQ606. In other embodiments, the user data is associated with a UE QQ606 that shares data with the host QQ602 without explicit human interaction. In step QQ610, the host QQ602 initiates a transmission carrying the user data towards the UE QQ606. The host QQ602 may initiate the transmission responsive to a request transmitted by the UE QQ606. The request may be caused by human interaction with the UE QQ606 or by operation of the client application executing on the UE QQ606. The transmission may pass via the network node QQ604, in accordance with the teachings of the embodiments described throughout this disclosure. Accordingly, in step QQ612, the network node QQ604 transmits to the UE QQ606 the user data that was carried in the transmission that the host QQ602 initiated, in accordance with the teachings of the embodiments described throughout this disclosure. In step QQ614, the UE QQ606 receives the user data carried in the transmission, which may be performed by a client application executed on the UE QQ606 associated with the host application executed by the host QQ602.

In some examples, the UE QQ606 executes a client application which provides user data to the host QQ602. The user data may be provided in reaction or response to the data received from the host QQ602. Accordingly, in step QQ616, the UE QQ606 may provide user data, which may be performed by executing the client application. In providing the user data, the client application may further consider user input received from the user via an input/output interface of the UE QQ606. Regardless of the specific manner in which the user data was provided, the UE QQ606 initiates, in step QQ618, transmission of the user data towards the host QQ602 via the network node QQ604. In step QQ620, in accordance with the teachings of the embodiments described throughout this disclosure, the network node QQ604 receives user data from the UE QQ606 and initiates transmission of the received user data towards the host QQ602. In step QQ622, the host QQ602 receives the user data carried in the transmission initiated by the UE QQ606.

One or more of the various embodiments improve the performance of OTT services provided to the UE QQ606 using the OTT connection QQ650, in which the wireless connection QQ670 forms the last segment. More precisely, the teachings of these embodiments may improve VLAN operations for RAN-based VLANs and thereby provide benefits such as dynamic VLAN configuration in 5GS.

In an example scenario, factory status information may be collected and analyzed by the host QQ602. As another example, the host QQ602 may process audio and video data which may have been retrieved from a UE for use in creating maps. As another example, the host QQ602 may collect and analyze real-time data to assist in controlling vehicle congestion (e.g., controlling traffic lights). As another example, the host QQ602 may store surveillance video uploaded by a UE. As another example, the host QQ602 may store or control access to media content such as video, audio, VR or AR which it can broadcast, multicast or unicast to UEs. As other examples, the host QQ602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection QQ650 between the host QQ602 and UE QQ606, in response to variations in the measurement results. The measurement procedure and/or the network functionality for reconfiguring the OTT connection may be implemented in software and hardware of the host QQ602 and/or UE QQ606. In some embodiments, sensors (not shown) may be deployed in or in association with other devices through which the OTT connection QQ650 passes; the sensors may participate in the measurement procedure by supplying values of the monitored quantities exemplified above or supplying values of other physical quantities from which software may compute or estimate the monitored quantities. The reconfiguring of the OTT connection QQ650 may include message format, retransmission settings, preferred routing etc.; the reconfiguring need not directly alter the operation of the network node QQ604. Such procedures and functionalities may be known and practiced in the art. In certain embodiments, measurements may involve proprietary UE signaling that facilitates measurements of throughput, propagation times, latency and the like, by the host QQ602. The measurements may be implemented in that software causes messages to be transmitted, in particular empty or 'dummy' messages, using the OTT connection QQ650 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions, and methods disclosed herein. Determining, calculating, obtaining or similar operations described herein may be performed by processing circuitry, which may process information by, for example, converting the obtained information into other information, comparing the obtained information, or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device but are enjoyed by the computing device as a whole, and/or by end users and a wireless network generally.

With the above examples in mind, example embodiments disclosed herein include but are not limited to the following:

Group A Embodiments

1. A method for VLAN configuration of a 5GS logical bridge in an Ethernet network where there is no centralized network controller in use.

2. A method to dynamically configure a VLAN on a 5GS logical bridge, wherein the configuration is dynamically updated based on network changes.

3. The method of embodiment 2, wherein the bridge ports of the 5GS logical bridge that are used for access mode are configured directly via an Application Function.

4. The method of embodiment 3, wherein the Application Function uses a group management API exposed via a Network Exposure Function (NEF) of the 5GS.

5. The method of embodiment 2, wherein the bridge ports of the 5GS logical bridge that are used for trunk mode are learned dynamically and configured by using Multiple VLAN Registration Protocol (MVRP) as defined by IEEE 802.1Q.

6. A method of reusing 5G Virtual Network (VN) groups for UE group management purposes, in the context of dynamic VLAN configuration with respect to a 5GS logical bridge.

7. The method of any of the previous embodiments, further comprising:

obtaining user data; and forwarding the user data to a host or a user equipment.

8. The method of embodiment 7, wherein forwarding the user data to the host or the user equipment comprises forwarding the data via a logical bridge in a telecommunication network operating according to dynamically-configured VLAN information.

9. A method of operation by an Application Function (AF) associated with a Fifth Generation System (5GS), the method comprising:

storing Virtual Local Area Network (VLAN) configuration information in 5G Virtual Network (VN) group data;

and passing the 5G VN Group Data to the 5GS, for use by the 5GS in dynamic configuration of a logical VLAN bridge implemented in the 5GS.

10. The method of embodiment 9, wherein the VLAN configuration information corresponds to one or more VLANs for grouping end stations in respective VLANs, the end stations communicating via the 5GS.

11. The method of embodiment 9 or 10, wherein the VLAN configuration information comprises a group name for each VLAN represented in the VLAN configuration.

12. The method of any of embodiments 9-11, wherein the method comprises indicating VLAN identifiers using any one of the following data fields in the 5G VN configuration data: the Application Descriptor data field, the S-NSSAI data field, or the DNN data field.

13. The method of any of embodiments 9-12, wherein the VLAN configuration information includes an allowed VLAN list, for use in the 5GS with respect to dynamic configuration of one or more trunk ports on the logical VLAN bridge.

14. A method of operation by a Unified Data Management (UDM) or User Data Repository (UDM) associated with a Fifth Generation System (5GS), the method comprising:

receiving 5G Virtual Network (VN) group data that embeds Virtual Local Area Network (VLAN) configuration information; and providing the 5G VN Group Data directly or indirectly to a Session Management Function (SMF) of the 5GS, for use by the SMF in dynamic configuration of a logical VLAN bridge implemented in the 5GS.

15. A method of operation by a Session Management Function (SMF) of a Fifth Generation System (5GS), the method comprising:

obtaining 5G Virtual Network (VN) group data that embeds Virtual Local Area Network (VLAN) configuration information; and with respect to a communication session involving a User Equipment (UE) that belongs to a VLAN defined in the VLAN configuration information, using the VLAN configuration information to perform, or initiate performance of, dynamic VLAN configuration of a logical VLAN bridge implemented in a User Plane Function (UPF) of the 5GS.

16. The method of embodiment 15, wherein the method comprises the SMF determining that the UE is associated with a trunk port and initiating MVRP to discover the VLAN affiliations of the trunk port.

17. The method of embodiment 15 or 16, wherein the method comprises the SMF or the UPF extracting VLAN identification information from a particular data field of the 5G VN Group Data, the particular data field being one of: the Application Descriptor data field, the S-NSSAI data field, or the DNN data field.

18. The method of any of embodiments 15-17, wherein the VLAN configuration information embedded in the 5G VN Group Data includes an allowed VLAN list, and wherein the method comprises the 5GS using MVRP to identify which VLANs are associated with a trunk port of the logical VLAN bridge, for which trunk port the VLAN configuration information indicates dynamic configuration, and then using the allowed VLAN list to determine which ones of the associated VLANs are allowed VLANs for the trunk port.

19. A method performed by one or more network functions (NFs) of a telecommunication network, the method comprising:

an Application Function (AF) using a group management API to configure VLAN information in a Unified Data Management (UDM)/User Data Repository (UDR), via a Network Exposure Function (NEF), the VLAN information defining one or more VLAN groups having respective VLAN IDs and associating UEs that act as virtual Access Ports (vAPs) to respective VLAN groups; the VLAN ID is associated with an "External Group ID" which is a identifier for a 5G VN group; for a UE used in access port mode, a VLAN ID is associated with an "External Group ID", or the VLAN ID is used directly as the "External Group ID"; for a UE used in trunk port mode, a default or pre-defined VLAN ID and a default or pre-defined "External Group ID" are assigned; the AF creates/updates/deletes a 5G VN Group using the "External Group ID" and a set of 5G VN Group configuration data;

a Unified Data Management (UDM) resolving the GPSI to SUPI, and requesting to create, update or delete the provisioned parameters as part of the subscriber data; if a new 5G VN Group is created, the UDM assigns an internal Group ID for each external Group ID; the UDM classifies the received parameters into AMF-associated and SMF-associated parameters; the UDM stores the SMF-associated parameters under corresponding Session Management Subscription data type; the UDM performs Nudm_SDM_Notification (SUPI or Internal Group Identifier, SMF-Associated parameter set, DNN/S-NSSAI, etc.) service operation;

a User Data Repository (UDR) storing the provisioned 5G VN Group Data as part of UE and/or group subscription data;

a Session Management Function (SMF), based on UDM 5G VN group information, deriving a corresponding VLAN ID for a 5G VN group, where the SMF indicates the VLAN ID to the UPF (e.g., in "Ethernet PDU session information" of N4/Packet Forwarding Control Protocol session); the SMF further indicating a default or pre-defined VLAN ID to the UPF, for UEs that are not associated with any of defined VLAN groups; and the UPF implementing a logical bridge supporting VLAN-based communications, based on the VLAN ID information received from SMF; wherein, if a VLAN ID indicated from SMF for a UE is a default or pre-defined VLAN (e.g. VLAN #4094), the VLAN configuration function at the UPF uses Multiple VLAN Registration Protocol (MVRP) operations to learn VLAN associations for the UEs indicated as having default or pre-defined VLAN IDs; after the MVRP operations are completed, a list of learned VLANs that are associated with the UEs is updated and stored in the VLAN configuration function at the UPF for VLAN bridging operations, e.g., VLAN filtering, traffic forwarding, flooding; for example, with respect to incoming Ethernet frames at the UE trunk port, only those tagged VLAN frames that are on the list are served, others are dropped; and wherein, if a VLAN ID indicated from the SMF for a UE is not the default or pre-defined VLAN ID, the VLAN configuration function at the UPF recognizes that the UE is a VLAN access port, therefore performs VLAN operations, such as tagging Ethernet frames with the indicated VLAN ID.

20. The method of embodiment 19, wherein UEs that act as virtual trunk ports are initially assigned the default or pre-defined VLAN ID and a default or pre-defined 5G VN group.

21. The method of embodiment 19, wherein when N6 or N19 interfaces act as trunk ports, the VLAN configuration function at the UPF uses MVRP operations to learn VLANs; after the MVRP operations are completed, a list of learned VLANs that are associated with the N6 or N19 interfaces is updated and stored in the VLAN configuration function at the UPF, for use in performing VLAN bridging operations, e.g., VLAN filtering, traffic forwarding, flooding.

22. The method of embodiment 19, wherein, if a N6 interface operates in VLAN access port mode, the method of embodiment 19 for access port configuration applies.

23. The method of embodiment 19, wherein the VLAN configuration function at the UPF maintains a VLAN table for UEs, and N6 and N19 interfaces.

Group B Embodiments

24. A network node comprising:

processing circuitry configured to perform any of the steps of any of the Group A embodiments;

power supply circuitry configured to supply power to the processing circuitry.

25. A network node comprising:

communication interface circuitry configured to communicatively couple the network node to one or more other network nodes; and processing circuitry operatively associated with the communication interface circuitry and configured to perform any of the steps of any of the Group A embodiments.

26. The network node of embodiment 25 wherein the network node operates as one or more Network Functions (NFs) in a 5G telecommunication network, for supporting dynamic VLAN configuration of a 5G logical bridge implemented in the 5G telecommunication network.

27. The network node of embodiment 26, wherein the one or more NFs include any one or more of a User Plane Function (UPF), a Session Management Function (SMF), a Network Exposure Function (NEF), an Application Function (AF), a Unified Data Management (UDM), or a User Data Repository (UDR).

28. A host configured to operate in a communication system to provide an over-the-top (OTT) service, the host comprising:

processing circuitry configured to provide user data; and
a network interface configured to initiate transmission of the user data to a cellular network for transmission to a user equipment (UE),
wherein the UE comprises a communication interface and processing circuitry to receive the user data from the host.

29. The host of the previous embodiment, wherein the cellular network further includes one or more network nodes configured to carry out any of the Group A embodiments, in conjunction with providing user data from the host to the UE via VLAN routing through a logical bridge provided by the cellular network.

30. The host of the previous 2 embodiments, wherein:

the processing circuitry of the host is configured to execute a host application, thereby providing the user data; and
the host application is configured to interact with a client application executing on the UE, the client application being associated with the host application.

31. A host configured to operate in a communication system to provide an over-the-top (OTT) service, the host comprising:

processing circuitry configured to provide user data; and
a network interface configured to initiate transmission of the user data to a cellular network for transmission to a user equipment (UE),
wherein the UE comprises a communication interface and processing circuitry, the communication interface and processing circuitry of the UE being configured to transmit the user data to the host.

32. The host of the previous embodiment, wherein the cellular network further includes a network node configured to communicate with the UE to transmit the user data from the UE to the host, based on routing the data according to a VLAN configuration implemented by a logical bridge provided by the cellular network.

33. The host of the previous 2 embodiments, wherein:

the processing circuitry of the host is configured to execute a host application, thereby providing the user data; and
the host application is configured to interact with a client application executing on the UE, the client application being associated with the host application.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by one or more network functions (NFs) of a Fifth Generation System (5GS) that provides Ethernet bridging operations for User Equipments (UEs) acting as Ethernet access ports or Ethernet trunk ports, the method comprising:

receiving Virtual Local Area Network (VLAN) configuration information for a User Equipment (UE) from an Application Function (AF), the VLAN configuration information for the UE comprising a predefined VLAN ID (VID) or a list of non-predefined VIDs if the UE is an Ethernet trunk port, or comprising a single non-predefined VID if the UE is an Ethernet access port; and
storing the VLAN configuration information, for subsequent use by the 5GS in configuring Ethernet bridging operations with respect to the UE, when establishing or modifying an Ethernet Protocol Data Unit (PDU) session for the UE.

2. The method according to claim 1, wherein the VLAN configuration information is received and stored as part of 5G Virtual Network (VN) Group Data.

3. The method according to claim 2, wherein the 5G VN Group Data is extended to include a VID field to hold the VLAN configuration information.

4. The method according to claim 2, wherein the VLAN configuration information is embedded in a Domain Network Name (DNN) field of the 5G VN Group Data.

5. The method according to claim 2, wherein the VLAN configuration information is embedded in an Application Descriptor field that is comprised in the 5G VN Group Data.

6. The method according to claim 2, wherein the VLAN configuration information is embedded in a Single Network Slice Selection Assistance Information (S-NSSAI) field that is comprised in the 5G VN Group Data.

7. The method according to claim 1, wherein, to receive the VLAN configuration information from the AF, the method includes providing a configuration Application Programming Interface (API) to the AF via a Network Exposure Function (NEF) of the 5GS that enables provisioning by the AF of the VLAN configuration information in 5G Virtual Network (VN) Group Data.

8. The method according to claim 7, wherein the NEF is configured to recognize the VLAN configuration information, as received from the AF as part of provisioning the 5G VN Group Data, and to place the VLAN configuration information in a dedicated data field added to the 5G VN Group Data for carrying the VLAN configuration information.

9. The method according to claim 1, wherein storing the VLAN configuration information for subsequent use by the 5GS comprises a Network Exposure Function (NEF) of the 5GS sending signaling indicating 5G VN Group Data to a node of the 5GS operating as a Unified Data Management (UDM)/Unified Data Repository (UDR), the 5G VN Group Data including the VLAN configuration information.

10. The method according to claim 1, wherein the receiving and storing steps of the method are performed by a Network Exposure Function (NEF) of the 5GS, and wherein the method further comprises a Session Management Function (SMF) of the 5GS subsequently retrieving the VLAN configuration information in conjunction with the 5GS establishing or modifying an Ethernet Protocol Data Unit (PDU) session for the UE.

11. The method of claim 10, wherein, in a case where the VLAN configuration information for the UE comprises a single non-predefined VID, a User Plane Function (UPF) associated with the SMF configures Ethernet bridging operations based on the UE being an Ethernet access port associated with a single VLAN identified by the single non-predefined VID; or wherein, in a case where the VLAN configuration information for the UE comprises a list of non-predefined VIDs, the UPF configures Ethernet bridging operations based on the UE being an Ethernet trunk port associated with multiple VLANs respectively identified by the list of non-predefined VIDs; or wherein, in a case where the VLAN configuration information for the UE comprises a single predefined VID, the UPF initiates Multiple VLAN Registration Protocol (MVRP) for the UE, to learn VIDs of VLANs associated with the UE and configures Ethernet bridging operations based on the UE being an Ethernet trunk port associated with multiple VLANs respectively identified by the learned VIDs.

12. A Fifth Generation System (5GS) configured to provide Ethernet bridging operations for User Equipments (UEs) acting as Ethernet access ports or Ethernet trunk ports, the 5GS comprising a network node that includes:

communication interface circuitry; and processing circuitry operatively associated with the communication interface circuitry and configured to operate the network node as a Network Exposure Function (NEF) that is configured to:

receive Virtual Local Area Network (VLAN) configuration information for a User Equipment (UE) from an Application Function (AF), the VLAN configuration information comprising a predefined VLAN ID (VID) or a list of non-predefined VIDs if the UE is an Ethernet trunk port, or comprising a single non-predefined VID if the UE is an Ethernet access port; and store the VLAN configuration information, for subsequent use by the 5GS in configuring Ethernet bridging operations with respect to the UE, when establishing or modifying an Ethernet Protocol Data Unit (PDU) session for the UE.

13. The 5GS according to claim 12, wherein the VLAN configuration information is received and stored as part of 5G Virtual Network (VN) Group Data.

14. The 5GS according to claim 13, wherein the 5G VN Group Data by extended to include a VID field to hold the VLAN configuration information.

15. The 5GS according to claim 13, wherein the VLAN configuration information is embedded in a Domain Network Name (DNN) field that is comprised in the 5G VN Group Data.

16. The 5GS according to claim 13, wherein the VLAN configuration information is embedded in an Application Descriptor field that is comprised in the 5G VN Group Data.

17. The 5GS according to claim 13, wherein the VLAN configuration information is embedded in a Single Network Slice Selection Assistance Information (S-NSSAI) field that is comprised in the 5G VN Group Data.

18. The 5GS according to claim 12, wherein, to receive the VLAN configuration information from the AF, the NEF is configured to provide a configuration Application Programming Interface (API) to the AF that enables provisioning by the AF of the VLAN configuration information in 5G Virtual Network (VN) Group Data.

19. The 5GS according to claim 12, wherein the NEF is configured to store the VLAN configuration information for subsequent use by the 5GS by sending signaling indicating 5G Virtual Network (VN) Group Data to another node of the 5GS operating as a Unified Data Management (UDM)/Unified Data Repository (UDR), the 5G VN Group Data including the VLAN configuration information.

20. The 5GS according to claim 12, wherein the 5GS further comprises a Session Management Function (SMF), where the SMF is configured to subsequently retrieve the VLAN configuration information in conjunction with the 5GS establishing or modifying an Ethernet Protocol Data Unit (PDU) session for the UE.

* * * * *